US012659860B2

(12) United States Patent
Yoon et al.

(10) Patent No.: US 12,659,860 B2
(45) Date of Patent: Jun. 16, 2026

(54) METHOD AND APPARATUS FOR REDUCING ELECTRIC POWER CONSUMPTION OF TERMINAL IN WIRELESS COMMUNICATION SYSTEM

(71) Applicant: SAMSUNG ELECTRONICS CO., LTD., Suwon-si (KR)

(72) Inventors: Suha Yoon, Suwon-si (KR); Suyoung Park, Suwon-si (KR); Euichang Jung, Suwon-si (KR); Hyunjung Kim, Suwon-si (KR); Seho Myung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/596,569

(22) Filed: Mar. 5, 2024

(65) Prior Publication Data

US 2024/0214930 A1     Jun. 27, 2024

Related U.S. Application Data

(63) Continuation of application No. 17/421,123, filed as application No. PCT/KR2020/000267 on Jan. 7, 2020, now Pat. No. 11,956,723.

(30) Foreign Application Priority Data

Jan. 8, 2019     (KR) ........................ 10-2019-0002408

(51) Int. Cl.
*H04W 52/02*          (2009.01)
*H04W 76/30*          (2018.01)
(52) U.S. Cl.
CPC ... *H04W 52/0225* (2013.01); *H04W 52/0212* (2013.01); *H04W 52/0277* (2013.01); *H04W 76/30* (2018.02)

(58) Field of Classification Search
None
See application file for complete search history.

(56) References Cited

U.S. PATENT DOCUMENTS 9,462,555 B2     10/2016  Jain et al.
9,642,048 B2      5/2017  Yavuz et al.
(Continued)

FOREIGN PATENT DOCUMENTS

CN          103200658 A      7/2013
CN          105682204 B      4/2019
(Continued)

OTHER PUBLICATIONS

Extended Search Report dated Jul. 15, 2024 in European Patent Application No. 24168851.4.
(Continued)

*Primary Examiner* — Christopher T Wyllie
(74) *Attorney, Agent, or Firm* — Nixon & Vanderhye, P.C.

(57)          ABSTRACT

The present disclosure relates to a 5G or pre-5G communication system for supporting a higher data transmission rate compared to a 4G communication system such as an LTE. According to an embodiment of the present invention, a method performed by a terminal in a wireless communication system comprises the steps of: identifying, by a first processor of the terminal, a state of the terminal; transmitting the state of the terminal to a second processor of the terminal; identifying an electric power-related parameter associated with the state of the terminal; and transmitting, to a base station, a terminal message including the electric power-related parameter.

17 Claims, 16 Drawing Sheets

(56) References Cited

U.S. PATENT DOCUMENTS

| | | | | |
|---|---|---|---|---|
| 9,843,958 | B2 | 12/2017 | Koc et al. | |
| 9,906,991 | B1* | 2/2018 | Peddiraju | H04W 36/26 |
| 10,085,172 | B2 | 9/2018 | Jain et al. | |
| 10,104,612 | B2 | 10/2018 | Chou et al. | |
| 10,111,128 | B2 | 10/2018 | Koc et al. | |
| 10,129,830 | B2 | 11/2018 | Koc et al. | |
| 10,588,055 | B2 | 3/2020 | Mandavilli et al. | |
| 10,863,389 | B2 | 12/2020 | Su et al. | |
| 2009/0068969 | A1* | 3/2009 | Lindoff | H04W 48/18 |
| | | | | 455/161.1 |
| 2011/0188485 | A1* | 8/2011 | Fodor | H04W 76/15 |
| | | | | 370/338 |
| 2011/0319072 | A1* | 12/2011 | Ekici | H04W 48/18 |
| | | | | 455/553.1 |
| 2011/0319073 | A1* | 12/2011 | Ekici | H04W 48/18 |
| | | | | 455/553.1 |
| 2012/0039226 | A1* | 2/2012 | Yang | H04W 52/0277 |
| | | | | 370/331 |
| 2012/0263051 | A1* | 10/2012 | Willars | H04W 76/20 |
| | | | | 370/255 |
| 2013/0005333 | A1 | 1/2013 | Chueh | |
| 2013/0095882 | A1 | 4/2013 | Saito | |
| 2013/0238917 | A1* | 9/2013 | Zhong | H04W 52/0235 |
| | | | | 713/320 |
| 2013/0267271 | A1 | 10/2013 | Chueh | |
| 2013/0288659 | A1* | 10/2013 | Hrabak | H04W 52/0277 |
| | | | | 455/419 |
| 2013/0301500 | A1 | 11/2013 | Koc et al. | |
| 2014/0036794 | A1 | 2/2014 | Koc et al. | |
| 2014/0044029 | A1* | 2/2014 | Chou | H04W 52/0216 |
| | | | | 370/331 |
| 2014/0066068 | A1* | 3/2014 | Suzuki | H04W 36/245 |
| | | | | 455/436 |
| 2014/0068314 | A1* | 3/2014 | Kim | G06F 1/28 |
| | | | | 713/340 |
| 2015/0189591 | A1 | 7/2015 | Koc et al. | |
| 2015/0271852 | A1 | 9/2015 | Rahman et al. | |
| 2015/0334653 | A1 | 11/2015 | Ang et al. | |
| 2015/0350611 | A1* | 12/2015 | Pearson | H04N 7/185 |
| | | | | 348/158 |
| 2016/0021007 | A1* | 1/2016 | Shuman | H04W 76/23 |
| | | | | 370/235 |
| 2016/0066217 | A1* | 3/2016 | Krishnamoorthy | H04W 48/18 |
| | | | | 455/436 |
| 2016/0143085 | A1* | 5/2016 | Cai | H04W 76/28 |
| | | | | 370/311 |
| 2016/0249405 | A1 | 8/2016 | Koc et al. | |
| 2016/0316425 | A1* | 10/2016 | Cili | H04W 24/08 |
| 2016/0381636 | A1* | 12/2016 | Park | H04L 27/0002 |
| | | | | 370/311 |
| 2017/0118715 | A1* | 4/2017 | Bhattacharya | H04W 52/0277 |
| 2017/0367047 | A1 | 12/2017 | Fujishiro et al. | |
| 2018/0103426 | A1* | 4/2018 | Nacer | H04W 52/0209 |
| 2018/0184231 | A1* | 6/2018 | Egner | H04W 24/10 |
| 2018/0234916 | A1* | 8/2018 | Song | H04W 48/18 |
| 2018/0241639 | A1* | 8/2018 | Roman | H04L 67/306 |
| 2018/0270758 | A1 | 9/2018 | Kang et al. | |
| 2018/0368016 | A1 | 12/2018 | Lee et al. | |
| 2019/0159132 | A1* | 5/2019 | Abraham | H04W 76/27 |
| 2019/0230515 | A1 | 7/2019 | Quan | |
| 2019/0313340 | A1 | 10/2019 | Lee | |
| 2019/0349905 | A1 | 11/2019 | Matsuda et al. | |
| 2020/0059345 | A1* | 2/2020 | Pelletier | H04L 1/16 |
| 2020/0100315 | A1* | 3/2020 | Jia | H04W 52/0235 |
| 2020/0137609 | A1* | 4/2020 | Jung | H04W 24/10 |
| 2020/0186991 | A1* | 6/2020 | He | H04L 5/1469 |
| 2020/0351792 | A1* | 11/2020 | Ghelichi | H04W 52/0277 |
| 2021/0025744 | A1* | 1/2021 | Raduchel | F24D 19/1063 |
| 2021/0076250 | A1* | 3/2021 | Wang | H04W 28/0221 |
| 2021/0136859 | A1 | 5/2021 | Yoo et al. | |
| 2022/0046738 | A1* | 2/2022 | Challa | H04W 24/10 |
| 2022/0150829 | A1* | 5/2022 | Yoon | H04W 52/0212 |
| 2023/0082416 | A1* | 3/2023 | Tuck | H04W 52/283 |
| | | | | 455/456.1 |
| 2023/0164647 | A1* | 5/2023 | Tao | H04W 36/083 |
| | | | | 370/331 |
| 2024/0147207 | A1* | 5/2024 | Watfa | H04W 12/106 |
| 2024/0214930 | A1* | 6/2024 | Yoon | H04W 52/0225 |

FOREIGN PATENT DOCUMENTS

| | | |
|---|---|---|
| CN | 107548095 B | 3/2020 |
| EP | 2654350 B1 | 12/2016 |
| JP | 2009194805 A | 8/2009 |
| JP | 2013090065 A | 5/2013 |
| JP | 5653474 B2 | 1/2015 |
| JP | 2018/110344 | 7/2018 |
| KR | 20070081178 A | 8/2007 |
| KR | 10-2017-0020548 | 2/2017 |
| KR | 10-2018-0084578 | 7/2018 |
| KR | 10-2018-0084578 A | 7/2018 |
| KR | 10-2018-0105445 | 9/2018 |
| KR | 102101928 B1 | 4/2020 |
| KR | 102370401 B1 | 3/2022 |
| WO | 2016/140069 | 9/2016 |
| WO | 2018/085145 | 5/2018 |
| WO | 2018/213688 | 11/2018 |

OTHER PUBLICATIONS

Office Action dated Jun. 21, 2024 in Korean Patent Application No. 10-2018-0002408 and English-language translation.

Samsung, R1-1810893, Discussion on triggering adaptation mechanism, 3GPP TSG RAN WG1 #94bis, Sep. 2018 (6 pages).

International Search Report for PCT/KR2020/000267 dated Apr. 13, 2020, 7 pages.

Written Opinion of the ISA for PCT/KR2020/000267 dated Apr. 13, 2020, 6 pages.

MediaTek Inc., "Adaptation framework for UE power saving, Document for: Discussion and decision", 3GPP TSG-RAN WG1 #95 R1-1812361, Spokane, USA, Nov. 12-16, 2018, 11 total pages.

Extended Search Report issued Feb. 1, 2022 in corresponding EP Application No. 20739091.5.

Samsung: "Triggering adaptation schemes", 3GPP Draft; R1-1813012 Triggering Adaptation Schemes, 3rd Generation Partnership Project (3GPP), vol. RAN WG1, No. Spokane, USA; Nov. 12, 2018-Nov. 16, 2018 Nov. 11, 2018 (Nov. 11, 2018), 3GPP TSG RAN WG1 Meeting #95, XP051554990.

Qualcomm Incorporated: "UE Adaptation to the Traffic and UE Power Consumption Characteristics", 3GPP Draft; R1-1813447 UE Adaptation for Power Saving, 3rd Generation Partnership Project (3GPP), vol. RANWG1, No. Spokane, Washington, USA; Nov. 12, 2018-Nov. 16, 2018 Nov. 11, 2018 (Nov. 11, 2018), 3GPP TSG RAN WG1 Meeting #95, XP051555486.

Yoon et al., U.S. Appl. No. 17/421,123, filed Jul. 7, 2021.

Office Action dated Feb. 24, 2026 in European Patent Application No. 24168851.4.

* cited by examiner

FIRST STATE ——————————————▶ BWP #1

SECOND STATE ——————————————▶ BWP #2

THIRD STATE ——————————————▶ BWP #3

FIG. 9

FIRST STATE ——————————————————► aggregated BW #1

SECOND STATE ——————————————————► aggregated BW #2

THIRD STATE ——————————————————► aggregated BW #3

METHOD AND APPARATUS FOR REDUCING ELECTRIC POWER CONSUMPTION OF TERMINAL IN WIRELESS COMMUNICATION SYSTEM

CROSS-REFERENCE TO RELATED APPLICATIONS

This application is a continuation of U.S. application Ser. No. 17/421,123, filed Jul. 7, 2021, now U.S. Pat. No. 11,956,723, which is the U.S. national phase of International Application No. PCT/KR2020/000267 filed Jan. 7, 2020 which designated the U.S. and claims priority to Korean Application No. 10-2019-0002408 filed Jan. 8, 2019, the entire contents of each of which are hereby incorporated by reference.

BACKGROUND

Technical Field

The disclosure relates to a method and apparatus for reducing power consumption of a portable terminal of a user.

Description of Related Art

To meet the ever increasing demand for wireless data traffic since the commercialization of 4th generation (4G) communication systems, efforts have been made to develop improved 5th generation (5G) or pre-5G communication systems. As such, 5G or pre-5G communication systems are also called "beyond 4G network system" or "post Long Term Evolution (LTE) system". To achieve high data rates, 5G communication systems are being considered for implementation in the extremely high frequency (mm Wave) band (e.g., 60 GHz band). To decrease path loss of radio waves and increase the transmission distance thereof in the mmWave band, various technologies including beamforming, massive multiple-input multiple-output (massive MIMO), full dimensional MIMO (FD-MIMO), array antennas, analog beamforming, and large scale antennas are considered for 5G communication systems. To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (COMP), interference cancellation, and the like. Additionally, advanced coding and modulation (ACM) schemes such as hybrid frequency shift keying and quadrature amplitude modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G systems.

Meanwhile, the Internet is evolving from a human centered network where humans create and consume information into the Internet of Things (IoT) where distributed elements such as things exchange and process information. There has also emerged the Internet of Everything (IoE) technology that combines IoT technology with big data processing technology through connection with cloud servers. To realize IoT, technology elements related to sensing, wired/wireless communication and network infrastructure, service interfacing, and security are needed, and technologies interconnecting things such as sensor networks, machine-to-machine (M2M) or machine type communication (MTC) are under research in recent years. In IoT environments, it is possible to provide intelligent Internet technology services, which collect and analyze data created by interconnected things to add new values to human life. Through convergence and combination between existing information technologies and various industries, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, technologies such as sensor networks and machine-to-machine (M2M) or machine type communication (MTC) are being realized by use of 5G communication technologies including beamforming, MIMO, and array antennas. Application of cloud RANs as a big data processing technique described above may be an instance of convergence of 5G technology and IoT technology.

On the other hand, a terminal using a 5G communication system uses a wider bandwidth than LTE, uses a higher frequency band (e.g., mmWave), and consumes more power compared with existing 4G (LTE).

SUMMARY

In the 5G communication system, there is a need for a method of reducing power consumption of a terminal. Accordingly, the disclosure proposes a method for reducing power consumption of a terminal according to the state of the terminal.

To solve the above problem, a method for a terminal of the disclosure includes: identifying, by a first processor of the terminal, the state of the terminal; transferring the state of the terminal to a second processor of the terminal; identifying a power-related parameter associated with the state of the terminal; and transmitting a terminal message including the power-related parameter to a base station.

In addition, to solve the above problem, a method for a base station of the disclosure includes: transmitting configuration information about at least one power-related parameter to a terminal; receiving, based on the state of the terminal, a terminal message including a power-related parameter associated with the state of the terminal; and transmitting a message for reconfiguring the power-related parameter based on the received power-related parameter.

In addition, to solve the above problem, a terminal of the disclosure includes: a transceiver; a first processor configured to identify the state of the terminal and transmit the state of the terminal to a second processor of the terminal; and the second processor configured to identify a power-related parameter associated with the state of the terminal and transmit a terminal message including the power-related parameter to a base station.

In addition, to solve the above problem, a base station of the disclosure includes: a transceiver; and a controller configured to transmit configuration information about at least one power-related parameter to a terminal, receive, based on the state of the terminal, a terminal message including a power-related parameter associated with the state of the terminal, and transmit a message for reconfiguring the power-related parameter based on the received power-related parameter.

According to an embodiment of the disclosure, by reducing the power consumption according to the state of the terminal, it is possible to increase the usage time of the terminal and improve the user experience.

BRIEF DESCRIPTION OF THE DRAWINGS

FIG. 9 is a diagram illustrating an association with the aggregated bandwidth (aggregated BW) based on the terminal state according to an embodiment of the disclosure.

DETAILED DESCRIPTION

Hereinafter, the operational principle of the disclosure will be described in detail with reference to the accompanying drawings. In the following description of the disclosure, detailed descriptions of well-known functions and structures incorporated herein may be omitted to avoid obscuring the subject matter of the disclosure. The terms described below are defined in consideration of their functions in the disclosure, and these may vary depending on the intention of the user, the operator, or the custom. Hence, their meanings should be determined based on the overall contents of this specification.

In the following description of the disclosure, detailed descriptions of well-known functions and structures incorporated herein may be omitted to avoid obscuring the subject matter of the disclosure. Now, embodiments of the present disclosure will be described with reference to the accompanying drawings.

Those terms used in the following description for identifying an access node, indicating a network entity, indicating a message, indicating an interface between network entities, and indicating various identification information are taken as illustration for ease of description. Accordingly, the disclosure is not limited by the terms to be described later, and other terms referring to objects having an equivalent technical meaning may be used.

For convenience of description below, the disclosure may use terms and names defined in the 3rd generation partnership project (3GPP) long term evolution (LTE) standards. However, the disclosure is not limited by the above terms and names, and may be equally applied to systems conforming to other standards. In the disclosure, "eNB" may be used interchangeably with "gNB" for convenience of description. That is, a base station described as an eNB may represent a gNB. In addition, the term "terminal" may refer not only to a mobile phone, a NB-IoT device, or a sensor but also to another wireless communication device.

Figure 1A:
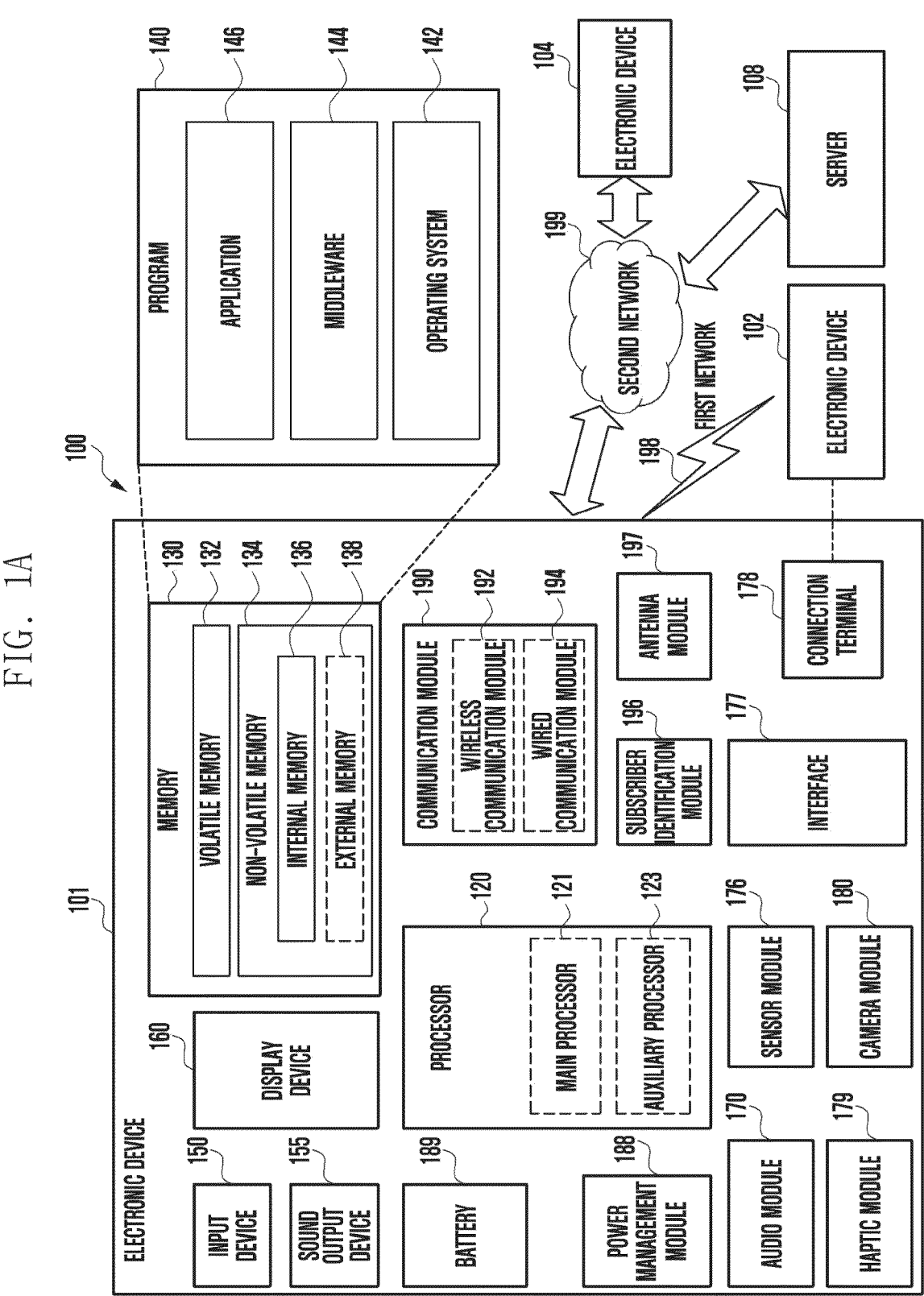
FIG. 1A is a block diagram of an electronic device 101 in a network environment 100 according to various embodiments.

FIG. 1A is a block diagram of an electronic device 101 in a network environment 100 according to various embodiments.

With reference to FIG. 1, the electronic device 101 in the network environment 100 may communicate with an electronic device 102 via a first network 198 (e.g., short-range wireless communication network), or may communicate with an electronic device 104 or a server 108 via a second network 199 (e.g., long-range wireless communication network). In one embodiment, the electronic device 101 may communicate with the electronic device 104 via the server 108. In one embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. In a certain embodiment, at least one (e.g., display device 160 or camera module 180) of the components may be omitted from the electronic device 101, or one or more other components may be added to the electronic device 101. In a certain embodiment, some of the components may be implemented as a single integrated circuit. For example, the sensor module 176 (e.g., fingerprint sensor, iris sensor, or illuminance sensor) may be implemented as being embedded in the display device 160 (e.g., display).

The processor 120 may control at least one of other components (e.g., hardware or software components) of the electronic device 101 connected to the processor 120 and perform various data processing or computations by executing, for example, software (e.g., programs 140). According to an embodiment, as at least part of data processing or computations, the processor 120 may load a command or data received from another component (e.g., sensor module 176 or communication module 190) in the volatile memory 132, process the command or data stored in the volatile memory 132, and store the result data in the non-volatile memory 134. According to an embodiment, the processor 120 may include a main processor 121 (e.g., central processing unit or application processor), and an auxiliary processor 123 (e.g., graphics processing unit, image signal processor, sensor hub processor, or communication processor) that is operable independently of or in conjunction with the main processor 121. Additionally or alternatively, the auxiliary processor 123 may be configured to consume less power than the main processor 121, or be specific to designated functionality. The auxiliary processor 123 may be implemented as separate from, or as part of the main processor 121.

The auxiliary processor 123 may control at least some of functions or states related to at least one component (e.g., display device 160, sensor module 176, or communication module 190) among the components of the electronic device 101, in place of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., image signal processor or communication processor) may be implemented as part of another component (e.g., camera module 180 or communication module 190) functionally related to the auxiliary processor 123.

The memory 130 may store various data used by at least one component (e.g., processor 120 or sensor module 176) of the electronic device 101. The data may include, for example, software (e.g., programs 140), and input data or output data for a command related thereto. The memory 130 may include the volatile memory 132 or the non-volatile memory 134.

The programs 140 may be stored as software in the memory 130 and may include, for example, an operating system 142, middleware 144, or applications 146.

The input device 150 may receive a command or data to be used by another component (e.g., processor 120) of the electronic device 101 from the outside of the electronic device 101 (e.g., user). The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes such as multimedia playback or recording playback, and the receiver may be used to receive an incoming call. According to an embodiment, the receiver may be implemented separately from the speaker or as part thereof.

The display device 160 may visually provide information to the outside of the electronic device 101 (e.g., user). The display device 160 may include, for example, a display, a hologram device, a projector, and a control circuit for controlling a corresponding device. According to an embodiment, the display device 160 may include touch circuitry configured to detect a touch, or sensor circuitry (e.g., pressure sensor) configured to measure the strength of a force generated by the touch.

The audio module 170 may convert a sound into an electric signal, or, conversely, may convert an electric signal into a sound. According to an embodiment, the audio module 170 may obtain a sound via the input device 150, or may output a sound via the sound output device 155 or an external electronic device (e.g., speaker or headphone of the electronic device 102) directly or wirelessly connected to the electronic device 101.

The sensor module 176 may detect an operational state (e.g., power or temperature) of the electronic device 101 or an external environmental state (e.g., user state), and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be directly or wirelessly connected to an external electronic device (e.g., electronic device 102). The interface 177 may include, for example, a high definition multimedia interface (HDMI), a universal serial bus (USB) interface, an SD card interface, or an audio interface.

A connecting terminal 178 may include a connector through which the electronic device 101 may be physically connected to an external electronic device (e.g., electronic device 102). According to an embodiment, the connecting terminal 178 may include, for example, a HDMI connector, a USB connector, a SD card connector, or an audio connector (e.g., headphone connector).

The haptic module 179 may convert an electrical signal into a mechanical stimulus (e.g., vibration or movement) or electrical stimulus that may be recognized by the user via their tactile or kinesthetic sensation. According to an embodiment, the haptic module 179 may include, for example, a motor, a piezoelectric element, or an electric stimulator.

The camera module 180 may capture still images and moving images. According to an embodiment, the camera module 180 may include one or more lenses, image sensors, image signal processors, or flashes.

The power management module 188 may manage power supplied to the electronic device 101. According to an embodiment, the power management module 188 may be implemented, for example, as at least part of a power management integrated circuit (PMIC).

The battery 189 may supply power to at least one component of the electronic device 101. According to an embodiment, the battery 189 may include, for example, a non-rechargeable primary cell, a rechargeable secondary cell, or a fuel cell.

The communication module 190 may support establishing a direct (e.g., wired) communication channel or a wireless communication channel between the electronic device 101 and the external electronic device (e.g., electronic device 102, electronic device 104, or server 108) and support performing communication via the established communication channel. The communication module 190 may include one or more communication processors that are operable independently of the processor 120 (e.g., application processor) and support direct (e.g., wired) communication or wireless communication. According to an embodiment, the communication module 190 may include a wireless communication module 192 (e.g., cellular communication module, short-range wireless communication module, or global navigation satellite system (GNSS) communication module), or a wired communication module 194 (e.g., local area network (LAN) communication module or power line communication module). A corresponding one of these communication modules may communicate with an external electronic device through the first network 198 (e.g., short-range communication network such as Bluetooth, Wi-Fi direct, or infrared data association (IrDA)) or through the second network 199 (e.g., long-range communication network such as a cellular network, the Internet, or a computer network (e.g., LAN or WAN)). These various types of communication modules may be integrated as a single component (e.g., single chip), or may be implemented as multiple components (e.g., multiple chips) separate from each other. The wireless communication module 192 may identify and authenticate the electronic device 101 in a communication network such as the first network 198 or the second network 199 by using the subscriber information (e.g., international mobile subscriber identity (IMSI)) stored in the subscriber identification module 196.

The antenna module 197 may transmit or receive a signal or power to or from the outside (e.g., external electronic device). According to an embodiment, the antenna module may include an antenna including a radiator made of a conductor or a conductive pattern formed on a substrate (e.g., PCB). According to an embodiment, the antenna module 197 may include a plurality of antennas. In such a case, at least one antenna appropriate for the communication scheme used in the communication network such as the first network 198 or the second network 199 may be selected by, for example, the communication module 190 from the plurality of antennas. A signal or power may be transmitted or received between the communication module 190 and an external electronic device via the selected at least one antenna. In a certain embodiment, another component (e.g., RFIC) other than a radiator may be additionally formed as part of the antenna module 197.

At least some of the above-described components may be interconnected and mutually communicate signals (e.g., commands or data) therebetween through an inter-peripheral communication scheme (e.g., bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 connected to the second network 199. The electronic devices 102 and 104 may be of a type identical to or different from that of the electronic device 101. According to an embodiment, all or some of operations executed on the electronic device 101 may be executed on at least one of the external electronic devices 102, 104 and 108. For example, when the electronic device 101 needs to perform a function or service automatically or in response to a request from the user or another device, the electronic device 101 may, instead of or in addition to directly executing the function or service, request one or more external electronic devices to execute at least some of the function or service. Upon receiving the request, the one or more external electronic devices may execute at least some of the requested function or service or an additional function or service related to the request, and return the execution results to the electronic device 101. The electronic device 101 may provide the results, as it is or after additional processing, as at least a part of a response to the request. To this end, technologies such as cloud computing, distributed computing, and client-server computing may be utilized.

The electronic devices according to various embodiments disclosed in this document may be devices of various types. The electronic devices may include, for example, a portable communication device (e.g., smartphone), a computer device, a portable multimedia device, a portable medical device, a camera, a wearable device, or a home appliance. The electronic devices according to embodiments of this document are not limited to the above-described devices.

Various embodiments of this document and terms used therein are not intended to limit the technical features described in this document to specific embodiments, and should be understood as including various modifications, equivalents, or substitutes of a corresponding embodiment. With regard to the description of the drawings, similar reference numerals may be used to refer to similar or related elements. A singular form of a noun corresponding to a specific item may include one or multiple pieces of the item unless the relevant context clearly indicates otherwise. In this document, each of phrases such as "A or B", "at least one of A and B", "at least one of A or B", "A, B or C", "at least one of A, B and C", and "at least one of A, B or C" may include any one of or all possible combinations of the items enumerated together in the corresponding one of the phrases. Terms such as "1st" and "2nd", or "first" and "second" may be used to simply distinguish a corresponding component from another, and does not limit the components in other aspect (e.g., importance or order). When an element (e.g., first element) is referred to, with or without the term "operatively" or "communicatively", as "coupled to/with" or "connected to/with" another element (e.g., second element), this means that the element may be connected or coupled to the other element directly (e.g., wiredly), wirelessly, or via a third element.

The term "module" used in this document may include a unit implemented in hardware, software, or firmware, and may be used interchangeably with other terms, for example, "logic", "logic block", "component", or "circuit". A module may be a single integral component, or a minimum unit or part thereof performing one or more functions. For example, according to an embodiment, a module may be implemented in a form of an application-specific integrated circuit (ASIC).

Various embodiments of this document may be implemented as software (e.g., programs 140) including one or more instructions that are stored in a storage medium (e.g., internal memory 136 or external memory 138) readable by a machine (e.g., electronic device 101). For example, a processor (e.g., processor 120) of the machine (e.g., electronic device 101) may invoke at least one of the one or more instructions stored in the storage medium to execute it. This allows the machine to be operated to perform at least one function according to the invoked at least one instruction. The one or more instructions may include a code generated by a complier or a code executable by an interpreter. The machine-readable storage medium may be provided in the form of a non-transitory storage medium. Here, the term "non-transitory" simply means that the storage medium is a tangible device and does not include a signal (e.g., electromagnetic wave), but this term does not distinguish whether data is stored semi-permanently or temporarily in the storage medium.

In an embodiment, a method according to various embodiments disclosed in this document may be included in a computer program product to be provided. The computer program product may be traded as a commodity between a seller and a purchaser. A computer program product may be distributed in the form of a machine-readable storage medium (e.g., compact disc read only memory (CD-ROM)) or be distributed online (e.g., download or upload) directly between two user devices (e.g. smartphones) through an application store (e.g., PlayStore™). For on-line distribution, at least a portion of the computer program product may be temporarily stored or temporarily created in a storage medium such as a memory of a manufacturer's server, an application store's server, or a relay server.

According to various embodiments, each component (e.g., module or program) of the above-described components may include a single entity or multiple entities. According to various embodiments, one or more components or operations may be omitted from the above-described components, or one or more other components or operations may be added. Alternatively or additionally, a plurality of components (e.g., modules or programs) may be integrated into a single component. In this case, the integrated component may perform one or more functions of each of the plurality of components in the same or similar manner as they are performed by a corresponding one of the plurality of components before the integration. According to various embodiments, operations performed by a module, a program, or another component may be carried out in sequence, in parallel, by repetition, or heuristically, or one or more of the operations may be executed in a different order or may be omitted, and one or more other operations may be added.

Figure 1B:
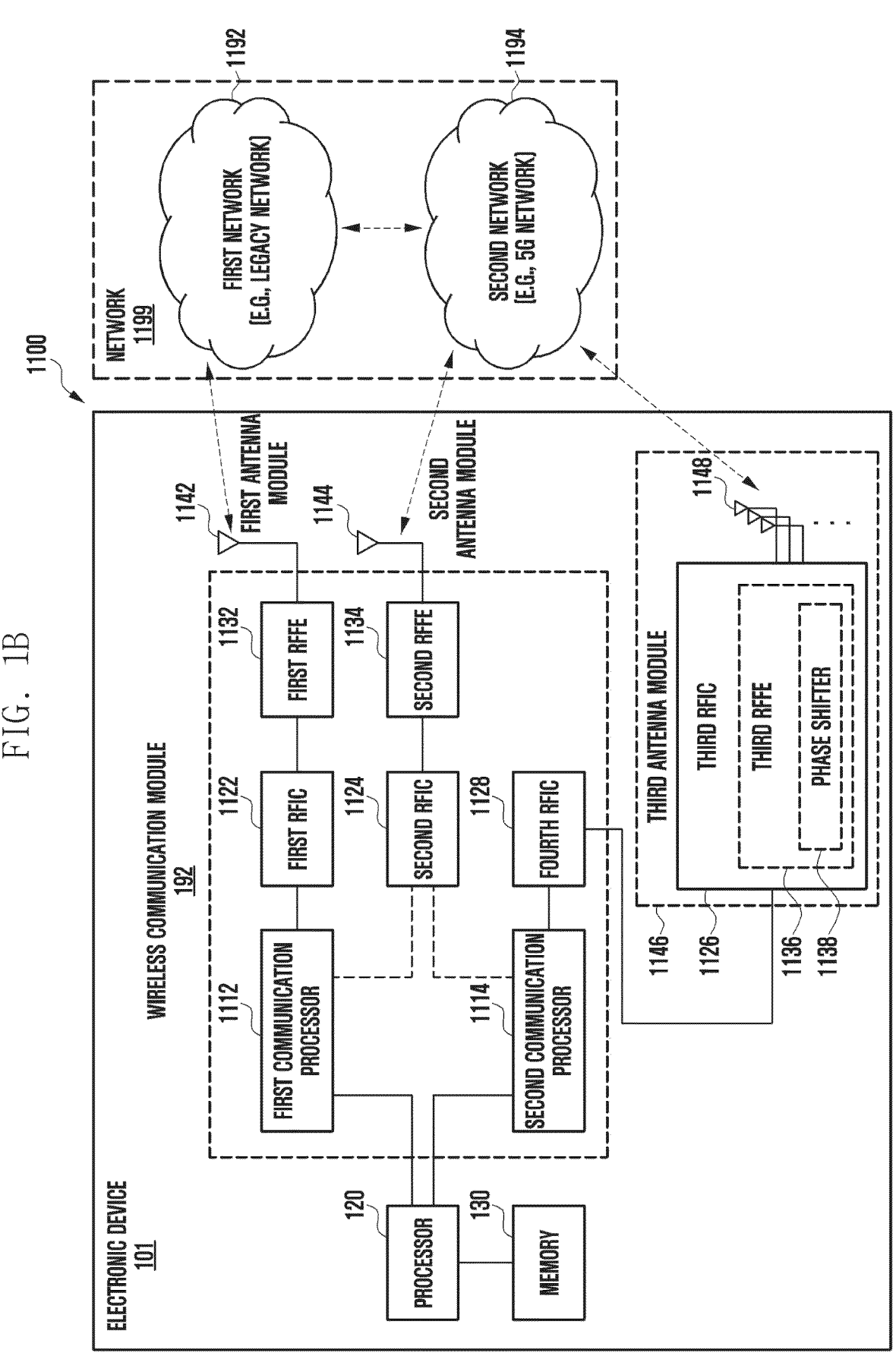
FIG. 1B is a block diagram 1100 of the electronic device 101 for supporting legacy network communication and 5G network communication according to various embodiments.

FIG. 1B is a block diagram 1100 of the electronic device 101 for supporting legacy network communication and 5G network communication according to various embodiments.

With reference to FIG. 1B, the electronic device 101 may include a first communication processor 1112, a second communication processor 1114, a first radio frequency integrated circuit (RFIC) 1122, a second RFIC 1124, a third RFIC 1126, a fourth RFIC 1128, a first radio frequency front end (RFFE) 1132, a second RFFE 1134, a first antenna module 1142, a second antenna module 1144, and an antenna 1148. The electronic device 101 may further include a processor 120 and a memory 130. The network 1199 may include a first network 1192 and a second network 1194. In another embodiment, the electronic device 101 may further include at least one of the components described in FIG. 1A, and the network 1199 may further include at least one other network. According to an embodiment, the first communication processor 1112, the second communication processor 1114, the first RFIC 1122, the second RFIC 1124, the fourth RFIC 1128, the first RFFE 1132, and the second RFFE 1134 may constitute at least a part of the wireless communication module 192. According to another embodiment, the fourth RFIC 1128 may be omitted or may be included as part of the third RFIC 1126.

The first communication processor 1112 may establish a communication channel of a band to be used for wireless communication with the first network 1192 and support legacy network communication through the established communication channel. According to various embodiments, the first network may be a legacy network including a second generation (2G), 3G, 4G, or long term evolution (LTE) network. The second communication processor 1114 may establish a communication channel corresponding to a designated band (e.g., about 6 GHz to about 60 GHZ) of bands to be used for wireless communication with the second network 1194, and support 5G network communication through the established communication channel. According to various embodiments, the second network 1194 may be a 5G network defined by 3GPP. Additionally, according to an embodiment, the first communication processor 1112 or the second communication processor 1114 may establish a communication channel corresponding to another designated band (e.g., about 6 GHz or less) of bands to be used for wireless communication with the second network 1194, and support 5G network communication through the established communication channel. According to an embodiment, the first communication processor 1112 and the second communication processor 1114 may be implemented in a single chip or a single package. According to various embodiments, the first communication processor 1112 or the second communication processor 1114 may be formed together with the processor 120, the auxiliary processor 123, or the communication module 190 in a single chip or a single package.

Upon transmission, the first RFIC 1122 may convert a baseband signal generated by the first communication processor 1112 into a radio frequency (RF) signal of about 700 MHz to about 3 GHz used in the first network 1192 (e.g., legacy network). Upon reception, an RF signal may be obtained from the first network 1192 (e.g., legacy network) through an antenna (e.g., first antenna module 1142) and be preprocessed through an RFFE (e.g., first RFFE 1132). The first RFIC 1122 may convert the preprocessed RF signal into a baseband signal so that it can be processed by the first communication processor 1112.

Upon transmission, the second RFIC 1124 may convert a baseband signal generated by the first communication processor 1112 or the second communication processor 1114 into an RF signal (hereinafter, 5G sub6 RF signal) of a sub6 band (e.g., about 6 GHz or less) to be used in the second network 1194 (e.g., 5G network). Upon reception, a 5G sub6 RF signal may be obtained from the second network 1194 (e.g., 5G network) through an antenna (e.g., second antenna module 1144) and be preprocessed through an RFFE (e.g., second RFFE 1134). The second RFIC 1124 may convert the preprocessed 5G sub6 RF signal into a baseband signal so that it can be processed by a corresponding communication processor of the first communication processor 1112 and the second communication processor 1114.

The third RFIC 1126 may convert a baseband signal generated by the second communication processor 1114 into an RF signal (hereinafter, 5G above 6 RF signal) of a 5G above 6 band (e.g., about 6 GHz to about 60 GHz) to be used in the second network 1194 (e.g., 5G network). Upon reception, a 5G above 6 RF signal may be obtained from the second network 1194 (e.g., 5G network) through an antenna (e.g., antenna 1148) and be preprocessed through the third RFFE 1136. The third RFIC 1126 may convert the preprocessed 5G above 6 RF signal into a baseband signal so that it can be processed by the second communication processor 1114. According to an embodiment, the third RFFE 1136 may be formed as part of the third RFIC 1126.

According to an embodiment, the electronic device 101 may include the fourth RFIC 1128 separately from the third RFIC 1126 or as at least part of the third RFIC 1126. In this case, the fourth RFIC 1128 may convert a baseband signal generated by the second communication processor 1114 into an RF signal (hereinafter, intermediate frequency (IF) signal) of an intermediate frequency band (e.g., about 9 GHz to about 11 GHZ) and transfer the IF signal to the third RFIC 1126. The third RFIC 1126 may convert the IF signal into a 5G Above 6RF signal. Upon reception, a 5G above 6 RF signal may be received from the second network 1194 (e.g., 5G network) through an antenna (e.g., antenna 1148) and be converted into an IF signal by the third RFIC 1126. The fourth RFIC 1128 may convert the IF signal into a baseband signal so that the second communication processor 1114 can process it.

According to an embodiment, the first RFIC 1122 and the second RFIC 1124 may be implemented in at least part of a single package or a single chip. According to an embodiment, the first RFFE 1132 and the second RFFE 1134 may be implemented in at least part of a single chip or a single package. According to an embodiment, at least one of the first antenna module 1142 or the second antenna module 1144 may be omitted or may be combined with another antenna module to process RF signals of corresponding plural bands.

According to an embodiment, the third RFIC 1126 and the antenna 1148 may be disposed at the same substrate to form a third antenna module 1146. For example, the wireless communication module 192 or the processor 120 may be disposed at a first substrate (e.g., main PCB). In such a case, the third RFIC 1126 may be disposed in a region (e.g., lower surface) of a second substrate (e.g., sub PCB) different from the first substrate and the antenna 1148 may be disposed in another region (e.g., upper surface) of the second substrate, forming the third antenna module 1146. By arranging the third RFIC 1126 and the antenna 1148 at the same substrate, the length of a transmission line therebetween can be reduced. This may reduce, for example, the loss (e.g., attenuation) of a signal of a high frequency band (e.g., about 6 GHz to about 60 GHz) used for 5G network communication due to the transmission line. Thereby, the electronic device 101 may improve the quality or speed of communication with the second network 1194 (e.g., 5G network).

According to an embodiment, the antenna 1148 may be formed as an antenna array including a plurality of antenna elements that can be used for beamforming. In this case, the third RFIC 1126 may include a plurality of phase shifters 1138 corresponding to the plural antenna elements, for example, as part of the third RFFE 1136. Upon transmission, each of the plural phase shifters 1138 may change the phase of a 5G above 6 RF signal to be transmitted to the outside (e.g., base station of a 5G network) of the electronic device 101 by use of a corresponding antenna element. Upon reception, the plural phase shifters 1138 may change the phases of 5G above 6 RF signals received from the outside to the same phase or substantially the same phase by use of corresponding antenna elements. This enables transmission or reception through beamforming between the electronic device 101 and the outside.

The second network 1194 (e.g., 5G network) may be operated independently of (e.g., standalone (SA)), or in connection with (e.g., non-standalone (NSA)) the first network 1192 (e.g., legacy network). For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of the core network (e.g., evolved packed core (EPC)) of the legacy network. Protocol information (e.g., LTE protocol information) for communication with a legacy network or protocol information (e.g., new radio (NR) protocol information) for communication with a 5G network may be stored in the memory 130, so that it may be accessed by other components (e.g., processor 120, first communication processor 1112, or second communication processor 1114).

Meanwhile, when using a 5G communication system, the power consumption of the terminal may increase. Therefore, there is a need for a method of reducing the power consumption of the terminal, and methods are being discussed, such as reduction of terminal power consumption in a radio resource control (RRC) state, and reduction of terminal power consumption for radio resource management (RRM) measurement in a synchronous/asynchronous network.

However, as a scheme to reduce the battery consumption of a terminal, a method may be used such as configuring discontinuous reception (DRX) or changing the state of a terminal from the RRC connected state to the RRC idle state, but this does not take into account the state of the terminal. Accordingly, for battery management of a terminal, there is a need for a method of controlling power consumption according to the state of the terminal. Hereinafter, a method for controlling power consumption according to the state of the terminal will be described.

To maximize the user experience through a long usage time, the terminal may provide various levels of the operating method/state/mode of the terminal.

For example, the state of a terminal may include a state in which there are no restrictions on the utilization of the components (e.g., CPU, display, and network) of the terminal (normal state), a state in which there are some restrictions on the utilization of the terminal (power saving state), and a state in which there is a maximum limit on the utilization of the terminal while providing only minimal functions (ultra power saving state).

As another example, the state of a terminal may include a state in which charging is in progress and a state in which charging is not in progress.

As another example, the state of a terminal may be determined according to the battery level of the terminal. Specifically, the battery level may be divided into a plurality of levels, and the state of the terminal may be determined according to the level corresponding to the battery level of the terminal. For example, the battery level may be divided into three levels including "zero to X percent" level, "X to Y percent" level, and "Y to 100 percent" level, and each level may be defined as the state of the terminal. Here, X and Y may be referred to as a first battery threshold and a second battery threshold for determining the state of the terminal. In addition, the above division is only an illustration, and three or more states or three or less states may be defined and threshold values may be defined accordingly.

As another example, the state of a terminal may be defined according to whether a specific application is running. For instance, the state of the terminal may include a state in which a specific application is running and a state in which the specific application is not running.

As another example, the state of a terminal may be defined based on data throughput. For instance, the state of the terminal may include a state requiring a throughput of A Gbps or more, a state requiring a throughput of B to A Gbps, and a state requiring a throughput of less than B Gbps. Here, the throughput required by the terminal may be determined according to whether a specific application is running. Here, the values of X and Y may be referred to as a first throughput threshold and a second throughput threshold for determining the state of the terminal. In addition, the above division is only an illustration, and three or more states or three or less states may be defined and threshold values may be defined accordingly.

As another example, the state of a terminal may include a plurality of states based on the number of available antennas N (1, 2, 3, . . . ) or a combination thereof according to whether a specific antenna module is being gripped by the user.

As another example, the state of a terminal may include a state in which the display of the terminal is turned on and a state in which the display is not turned on.

As another example, the state of a terminal can be divided according to whether the terminal is in a doze state, an app standby state, or a normal state. When the screen is turned off for a certain period of time or longer while the terminal is not being charged, the terminal may enter the doze state. When the user does not touch an application for a certain period of time while the terminal is not being charged and there is no process currently in the foreground, the terminal may enter the app standby state. When the terminal is being charged or is being used by the user, the terminal may enter the normal state.

The operating state of the terminal is not limited to those described above, and other operating states may be included.

In addition, the state of the terminal may be defined according to a combination of the above conditions. For example, the state of the terminal may be defined according to the battery state and required throughput of the terminal.

Alternatively, the user may directly configure a desired operation method/state/mode of the terminal and use it in the terminal. For example, the user may select a desired operation method/state/mode through a terminal operation method/state/mode setting menu displayed on the touch screen of the user terminal. Hence, the terminal may check an input for the state and operate accordingly.

Table 1 shows an operation method/state/mode of a terminal according to an embodiment of the disclosure. In the following description, three states are described as an illustration, but the scope of the disclosure is not limited thereto.

That is, the number of states of the terminal can be changed according to the settings of the terminal or the user, and normal mode, medium power saving mode, and maximum power saving mode below are only illustrative names of the states and may be changed. In the disclosure, they may be referred to as a first mode, a second mode, a third mode, and the like.

TABLE 1

| Terminal operation method/state/mode | |
| --- | --- |
| First state (Normal mode) | State in which the function and performance of the terminal are not restricted |
| Second state (Medium power saving mode (Medium low power mode)) | State in which some functions and performance of the terminal are restricted, for example, as follows: Restrict the use of background network Restrict the use of functions that provide information on key information (e.g., time, date, schedule) by turning on the display when the terminal is not in use Restrict the speed and clock of the CPU of the terminal Restrict the brightness of the terminal screen Restrict the resolution of the terminal screen Restrict some communication modes for example, limit the number of carriers in carrier aggregation for example, turn off 5G and use LTE only for example, turn off mmWave (FR2) and use sub-6 (FR1) only Etc. |
| Third state (Maximum power saving mode (Maximum low power mode)) | State in which some functions and performance of the terminal are restricted, for example, as follows in addition to the restrictions of medium power saving mode: Limit the terminal's background screen to black Restrict the use of some applications (e.g., camera, video playback) Restrict some communication modes for example, limit the number of carriers in carrier aggregation for example, turn off 5G and use LTE only for example, turn off mmWave (FR2) and use sub-6 (FR1) only Etc. |

Meanwhile, to provide data communication to a user terminal, the communication network may configure various parameters defined in the communication standard for the terminal and perform communication with the terminal according to the configuration. Depending on the above configuration, high throughput may be provided to the terminal, or low throughput may be provided while minimizing power consumption of the terminal. Examples of these parameters may include bandwidth part (BWP), power profile, aggregated bandwidth (aggregated BW), carrier number (# of carriers), parameters related to antenna operation, and UE category, and there may be other parameters in addition to those described above. In the disclosure, these parameters are referred to as power-related parameters or parameters.

In the disclosure, the terminal may properly associate the state of the terminal with at least one parameter. For example, the ultra power saving state of the terminal may be associated with a parameter that provides the minimum power consumption.

For example, a state that requires high data throughput may be associated with a parameter that provides high data throughput. In addition, a state with a low battery level may be associated with a parameter providing low power consumption. The network may also properly associate the state of the terminal with the at least one parameter.

The terminal may provide the terminal state to the network. For example, the terminal may provide the terminal state to the network through UE assistance information or temporary capability information, and the information or message used by the terminal is not limited thereto.

Hence, the terminal may provide the terminal state (e.g., normal state, power saving state, or ultra power saving state) to the network, and the network may configure the corresponding parameter for the terminal, so that the battery of the terminal can be efficiently managed.

Figure 2:
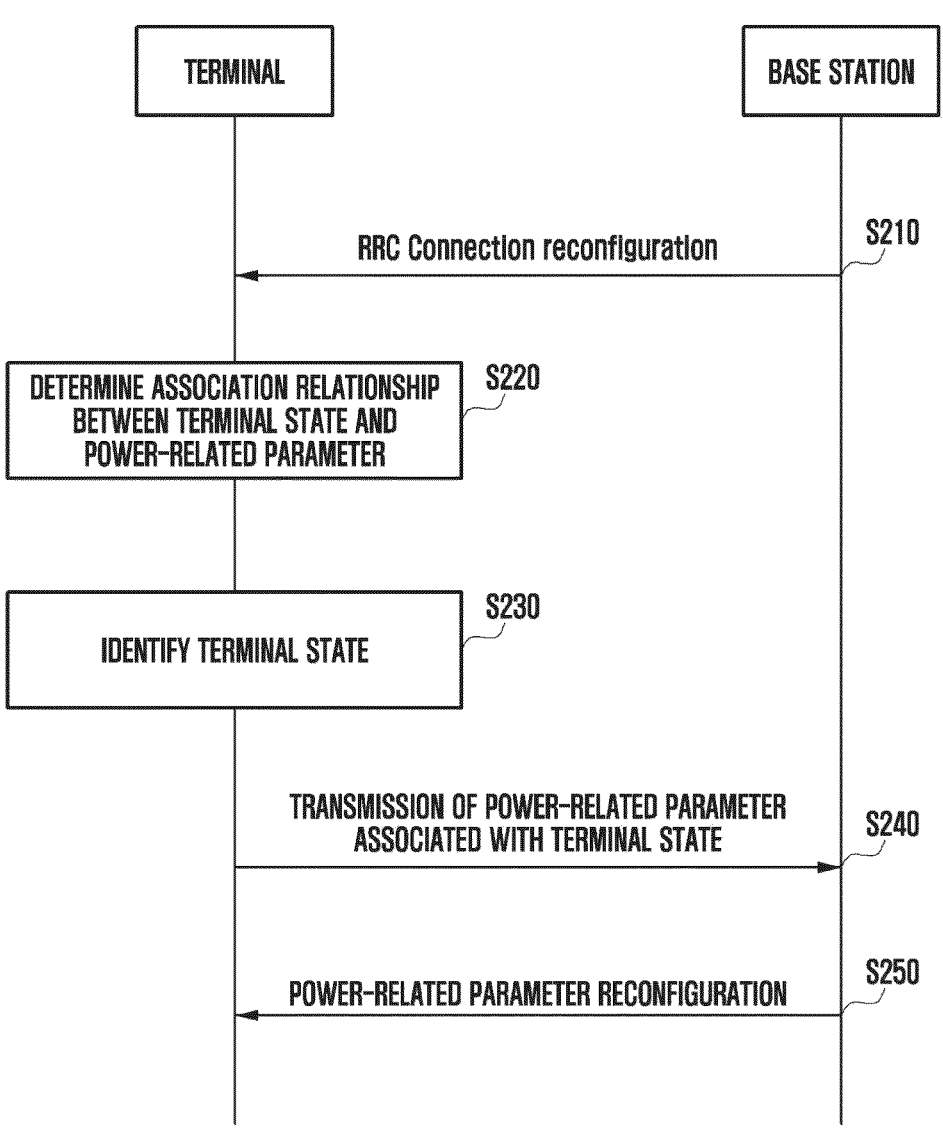
FIG. 2 is a diagram illustrating operations of a terminal and a base station to reduce power consumption of the terminal according to an embodiment of the disclosure.

FIG. 2 is a diagram illustrating operations of a terminal and a base station to reduce power consumption of the terminal according to an embodiment of the disclosure.

With reference to FIG. 2, the terminal may connect to the base station and may be configured with power-related information (or, portion of power-related information) accordingly.

Specifically, at step S210, for connection establishment or reconfiguration with the terminal, the base station may transmit an RRC message to the terminal. The RRC message may include, for example, an RRC connection reconfiguration message. The base station may configure a power-related parameter to the terminal through the above message. As described above, the power-related parameter may include at least one of parameters such as bandwidth part, power profile, aggregated bandwidth, carrier number, parameters related to antenna operation, and UE category. For example, the power-related parameter may include information on the bandwidth part only, or may be composed of a combination of the bandwidth part and the power profile, which may be referred to as a power-related parameter set.

Thereafter, at step S220, the terminal may determine an association (or mapping) relationship between the power-related parameters according to the terminal state. The terminal may be configured with a plurality of power-related parameters (or, power-related parameter set) through the RRC message, and may associate (or, map) the power-related parameters (or, power-related parameter set) for each terminal state.

A plurality of power-related parameters may mean that multiple values can be set for one type of power-related parameter (BWP #1, #2 and #3 are set). For example, when the power-related parameter is the bandwidth part, this means that multiple values may be set for the bandwidth part.

Additionally, a plurality of power-related parameters may mean that multiple combinations of values can be set for multiple types of power parameters. For example, when the power-related parameters are the bandwidth part and the carrier number, by forming one power-related parameter utilizing bandwidth-part index 1 and carrier number index 1, a plurality of power-related parameters may be set (setting "BWP #1, nofcarrier #1", "BWP #2, nofcarrier #2", . . . ).

In addition, multiple types of power parameters may each be set for multiple values without being associated (BWP #1, #2, #3& nofcarrier #1, #2, #3 are set separately). In such a case, the terminal may determine an association relationship for each type of power parameter.

As an example for a mapping method, when the power-related parameter is the bandwidth part, a plurality of bandwidth parts may be configured in the terminal, and the terminal may map terminal states to the bandwidth parts.

Alternatively, when the power-related parameter is composed of a combination of plural parameters such as bandwidth part, power profile, and carrier number, a plurality of power-related parameter sets may be configured in the terminal, and the terminal may map terminal states to the power-related parameter sets. Details of the power-related parameters will be described later.

Based on the amount of battery consumption and data throughput in the case of using a configured power-related parameter, the terminal may map the terminal state to the power-related parameter. That is, the terminal uses a relationship between an element for defining the terminal state and a power parameter.

For example, when the terminal state is determined according to battery consumption, the terminal may calculate the battery consumption in the case of using each of the configured power-related parameters, and may map individual terminal states to the power-related parameters.

As another example, when the terminal state is determined according to the throughput required by the terminal, the terminal may calculate the throughput in the case of using the configured power-related parameters, and may map individual terminal states to the power-related parameters.

Thereafter, at step S230, the terminal may identify the terminal state. Here, the terminal state can be identified by the terminal according to the conditions described above. Or, the terminal may identify a state change by detecting an external input.

Then, at step S240, the terminal may transmit a power-related parameter associated with the terminal state to the base station. Here, the terminal may transmit the index of the configured power-related parameter to the base station. The terminal may transmit a power-related parameter associated with the terminal state to the base station when the state of the terminal is changed or according to a preset period.

In this case, the terminal may transmit a power-related parameter mapped to the terminal state to the base station by using UE assistance information or the like. However, the scope of the disclosure is not limited thereto, and the terminal may use another message.

Hence, at step S250, the base station may reconfigure power-related parameters to the terminal based on the received information. Here, the base station may reconfigure the power-related parameters by using downlink control information (DCI) or an RRC message.

In this way, the base station may reconfigure the power-related parameters in consideration of the state of the terminal, thereby effectively reducing the power consumption of the terminal.

Figure 3:
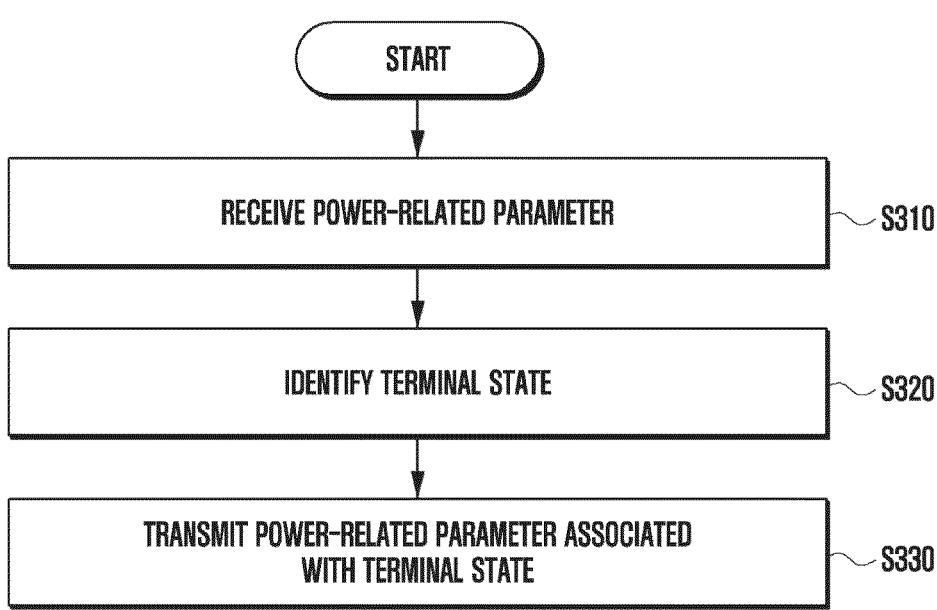
FIG. 3 is a diagram illustrating operations of a terminal according to an embodiment of the disclosure.

FIG. 3 is a diagram illustrating operations of a terminal according to an embodiment of the disclosure.

With reference to FIG. 3, at step S310, the terminal may receive information on power-related parameters from the base station. The terminal may receive power-related parameters during an initial attach process or a connection reconfiguration process.

Hence, the terminal may associate (or map) the terminal state with a power-related parameter. The method of associating the terminal state with the power-related parameter will be described later and will be omitted in this drawing.

Then, at step S320, the terminal can identify the state of the terminal. The terminal may change its state according to an external input. For example, the user may change the state of the terminal through the touchscreen of the terminal or the like, and the terminal may identify its state by detecting an input for the terminal state. Alternatively, the state of the terminal may be changed according to a predetermined condition for defining the terminal state. When the terminal state is changed, the terminal may transmit a power-related parameter associated with the terminal state to the base station at step S330.

Accordingly, the terminal may receive a newly configured power-related parameter and operate correspondingly.

Hereinafter, a description will be given of specific embodiments in which the terminal receives power-related parameters from the base station and associates terminal states with them.

Figure 4:
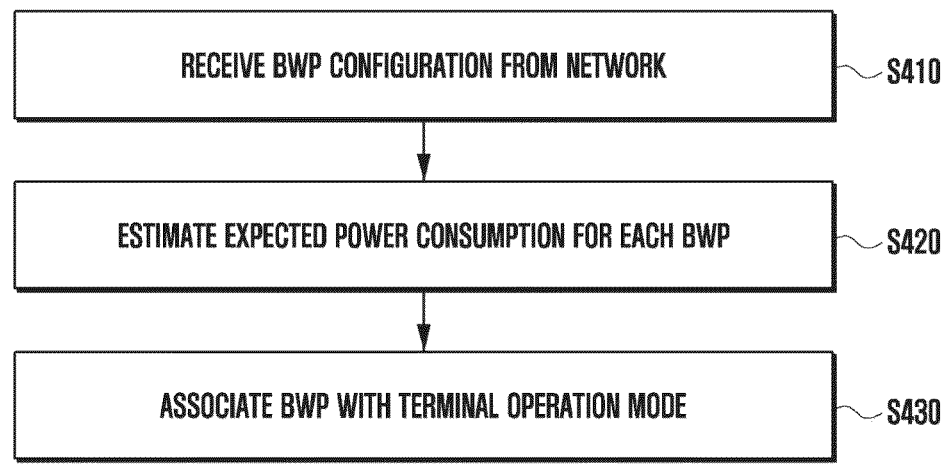
FIG. 4 is a diagram illustrating a method for associating bandwidth parts based on terminal states according to an embodiment of the disclosure.

FIG. 4 is a diagram illustrating a method for associating bandwidth parts based on terminal states according to an embodiment of the disclosure.

For each cell, one or more bandwidth parts (BWPs) may be configured in the terminal. Additionally, physical downlink control channel (PDCCH)-related configuration parameters and PDSCH-related configuration parameters may be configured for each BWP. Table 2 illustrates BWP configuration information.

TABLE 2

| BWP-Downlink information element |
|---|

```
-- ASN1START
-- TAG-BWP-DOWNLINK-START
BWP-Downlink ::=              SEQUENCE {
   bwp-Id                       BWP-Id,
   bwp-Common                      BWP-DownlinkCommon
OPTIONAL,   -- Cond SetupOtherBWP
   bwp-Dedicated                   BWP-DownlinkDedicated
OPTIONAL,   -- Need M

...

}
-- TAG-BWP-DOWNLINK-STOP
-- ASN1STOP
```

TABLE 2-continued

| BWP-DownlinkCommon information element |
|---|

```
-- ASN1START
-- TAG-BWP-DOWNLINKCOMMON-START
BWP-DownlinkCommon ::=          SEQUENCE {
   genericParameters                BWP,
   pdcch-ConfigCommon                  SetupRelease { PDCCH-ConfigCommon }
OPTIONAL,   -- Need M
   pdsch-ConfigCommon                  SetupRelease { PDSCH-ConfigCommon }
OPTIONAL,   -- Need M
   ...
}
-- TAG-BWP-DOWNLINKCOMMON-STOP
-- ASN1STOP
```

| BWP-Uplink information element |
|---|

```
-- ASN1START
-- TAG-BWP-UPLINK-START
BWP-Uplink ::=                  SEQUENCE {
   bwp-Id                           BWP-Id,
   bwp-Common                          BWP-UplinkCommon
OPTIONAL,   -- Cond SetupOtherBWP
   bwp-Dedicated                       BWP-UplinkDedicated
OPTIONAL,   -- Need M
   ...
}
-- TAG-BWP-UPLINK-STOP
-- ASN1STOP
```

| BWP-UplinkCommon information element |
|---|

```
-- ASN1START
-- TAG-BWP-UPLINKCOMMON-START
BWP-UplinkCommon ::=           SEQUENCE {
   genericParameters               BWP,
   rach-ConfigCommon                  SetupRelease { RACH-ConfigCommon }
OPTIONAL,   -- Need M
   pusch-ConfigCommon                 SetupRelease { PUSCH-ConfigCommon }
OPTIONAL,   -- Need M
   pucch-ConfigCommon                 SetupRelease { PUCCH-ConfigCommon }
OPTIONAL,   -- Need M
   ...
}
-- TAG-BWP-UPLINKCOMMON-STOP
-- ASN1STOP
```

| BWP information element |
|---|

```
-- ASN1START
-- TAG-BANDWIDTH-PART-START
BWP ::=                        SEQUENCE {
   locationAndBandwidth            INTEGER (0..37949),
   subcarrierSpacing               SubcarrierSpacing,
   cyclicPrefix                    ENUMERATED { extended }
OPTIONAL   -- Need R
}
-- TAG-BANDWIDTH-PART-STOP
-- ASN1STOP
```

According to the BWP configuration information as shown in Table 2, the power consumption of the terminal may be different for individual BWPs. For example, a BWP configured with a wide bandwidth may consume more power than a BWP configured with a narrow bandwidth. As another example, PDCCH monitoring parameters can be set for each BWP, and a BWP configured to monitor more PDCCH candidates may consume more power than a BWP configured to monitor fewer PDCCH candidates. As another example, time domain resource allocation parameters (i.e. time domain resource allocation) of the PDSCH and PUSCH may be configured for each BWP, and hence power consumption may be different for different BWPs. As another example, a distance (K0) between the PDCCH and the physical downlink shared channel (PDSCH) on the time axis, a distance (K2) between the PDCCH and the physical uplink shared channel (PUSCH) on the time axis, and a distance (K1) between the PDSCH and the physical uplink control channel (PUCCH) on the time axis may be configured for each BWP, and hence power consumption may vary for different BWPs.

At step S410, the terminal may receive at least one BWP configuration information from the network.

Thereafter, at step S420, the terminal may estimate the expected power consumption for each BWP. Here, the following methods may be used as a scheme for estimating the expected power consumption.

For example, the terminal may estimate the power consumption by using the power consumption expected when performing a unit operation for each parameter of the BWP configuration. The terminal may store power consumption expected when performing a unit operation for estimating power consumption, and may calculate (estimate) the power consumption based on this.

Alternatively, the network may indicate the estimated power consumption for each BWP. The base station may indicate the estimated power consumption for each BWP in an explicit or implicit manner. For example, the larger the value of the BWP index, the more power consumption may be. Or, conversely, the larger the value of the BWP index, the less power consumption may be. Or, information on the estimated power consumption may be included in the BWP configuration.

Hence, at step S430, the terminal may associate the terminal state with the BWP based on the estimated power consumption for each BWP. Then, the terminal may store the association result, for example, in the form of a table.

Thereafter, the network may reconfigure the BWP configured in the terminal through an RRC message. The terminal may perform the operations as shown in FIG. 4 again by using the newly received BWP configuration information, and the index of the BWP associated with each terminal state may be changed accordingly.

Later, when the terminal state is changed, the terminal may operate according to FIG. 3. The user may change the state of the terminal through the touchscreen of the terminal or the like, and the terminal may receive or detect an input for a state change. Alternatively, the state of the terminal may be changed according to a predetermined condition. When the state of the terminal is changed, the terminal may determine the BWP associated with the changed terminal state. Then, the terminal may transmit the associated BWP to the network through a terminal message (e.g., UE assistance information). Accordingly, the base station may reconfigure the BWP to the terminal. The base station may configure again the BWP that is the same as the BWP fed back by the terminal to the terminal, or may select an appropriate BWP with reference to the BWP fed back by the terminal and configure it again. For example, when the terminal transmits UE assistance information including information corresponding to BWP index 1, the network may transmit the terminal an RRC reconfiguration message for reconfiguration with BWP index 1. Or, the network may configure the terminal to operate with BWP 1 through the DCI. Or, when the terminal performs transmission together with information corresponding to BWP index 1, the base station may configure again a new BWP in consideration of the terminal state corresponding to BWP index 1. That is, it is possible to configure a new power profile different from BWP index 1, 2 or 3 previously configured by the base station. Since specific details are the same as described above, they will be omitted below.

Figure 5:
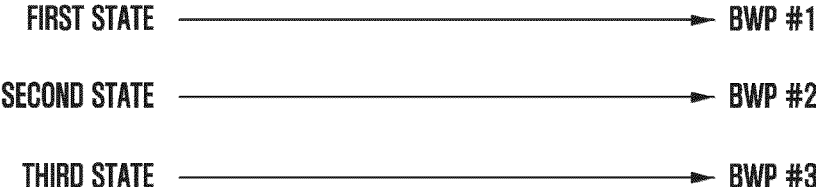
FIG. 5 is a diagram illustrating an association with the BWP based on the terminal state according to an embodiment of the disclosure.

FIG. 5 is a diagram illustrating an association with the BWP based on the terminal state according to an embodiment of the disclosure.

As described herein, in the disclosure, a case in which three terminal states are defined is described as an illustration, but embodiments of the disclosure are not limited thereto. That is, the number and details of terminal states can be changed according to user settings or terminal settings.

With reference to FIG. 5, the terminal may associate terminal states with BWP indexes. Therefore, when the terminal confirms a state change, it may transmit the associated BWP index to the base station, and the base station may reconfigure the BWP based on the received BWP index.

However, the base station may configure again the same BWP as the BWP index transmitted by the terminal, or may configure again a different BWP with reference to the BWP index. Details are the same as described above.

Additionally, in this drawing, a case in which the terminal state and the BWP index are associated one to one is described as an illustration, but embodiments of the disclosure are not limited thereto.

That is, a plurality of BWP indexes may be associated with one state, or a plurality of states may be associated with one BWP index. If a plurality of BWP indexes are associated with one state, the terminal may transmit all the BWP indexes or may select one of the BWP indexes and transmit it to the base station. For example, if it is required to transmit one index, the terminal may transmit the index of a power-related parameter having low power consumption. This can be applied not only to the BWP index, but also to overall power-related parameters to be described later.

Figure 6:
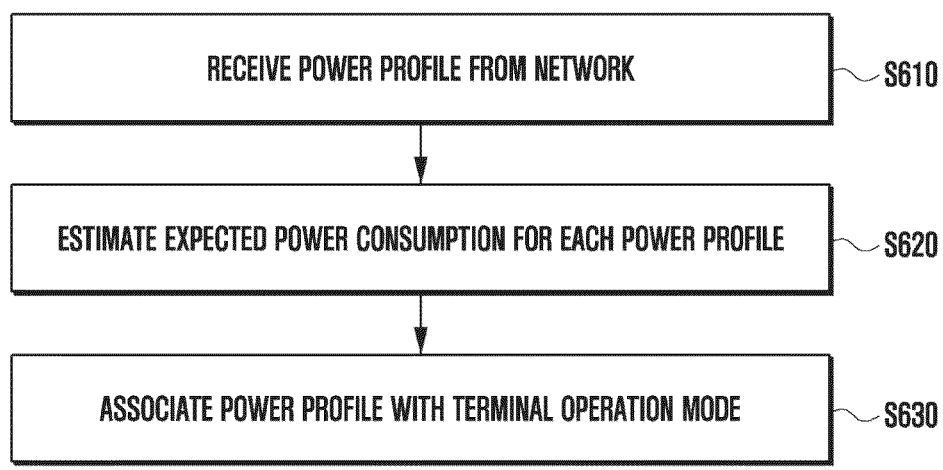
FIG. 6 is a diagram illustrating a method for associating power profiles based on terminal states according to an embodiment of the disclosure.

FIG. 6 is a diagram illustrating a method for associating power profiles based on terminal states according to an embodiment of the disclosure.

At step S610, the terminal may receive at least one power profile configuration information from the network. The power profile will be described later.

Thereafter, the terminal may estimate the expected power consumption for each power profile. Here, the following methods may be used as a scheme for estimating the expected power consumption.

For example, the terminal may estimate the power consumption by using the power consumption expected when performing a unit operation for each parameter of the power profile configuration. The terminal may store power consumption expected when performing a unit operation for estimating power consumption, and may calculate the power consumption based on this.

Alternatively, the network may indicate the estimated power consumption for each power profile. The base station may indicate the estimated power consumption for each power profile in an explicit or implicit manner. For example, the larger the value of the power profile index, the more power consumption may be. Or, conversely, the larger the value of the power profile index, the less power consumption may be. Or, information on the estimated power consumption may be included in the power profile configuration.

Hence, at step S630, the terminal may associate the terminal operation method/state/mode with the power profile based on the estimated power consumption for each power profile. Then, the terminal may store the association result, for example, in the form of a table. Thereafter, the network may reconfigure the power profile configured in the terminal through an RRC message. The terminal may perform the operations as shown in FIG. 6 again by using the newly received power profile configuration information, and the index of the power profile associated with each terminal state may be changed accordingly.

Later, when the terminal state is changed, the terminal may operate according to FIG. 3. The user may change the state of the terminal through the touchscreen of the terminal or the like, and the terminal may receive or detect an input for a state change. Alternatively, the state of the terminal may be changed according to a predetermined condition. When the operation mode of the terminal is changed, the terminal may determine the power profile associated with the changed terminal state. Then, the terminal may transmit the associated power profile to the network through a terminal message (e.g., UE assistance information). Accordingly, the network may receive the UE assistance information transmitted by the terminal, and use the corresponding information for power profile reconfiguration. The base station may configure again the power profile that is the same as the power profile fed back by the terminal to the terminal, or may select an appropriate power profile with reference to the power profile fed back by the terminal and configure it again. For example, when the terminal transmits UE assistance information including information corresponding to power profile index 1, the network may transmit the terminal an RRC reconfiguration message for reconfiguration with power profile index 1. Or, the network may configure the terminal to operate with BWP 1 through the DCI. Or, when the terminal performs transmission together with information corresponding to power profile index 1, the base station may configure again a new power profile in consideration of the terminal state corresponding to power profile index 1. That is, it is possible to configure a new power profile different from power profile index 1, 2 or 3 previously configured by the base station. Since specific details are the same as described above, they will be omitted below.

Figure 7:
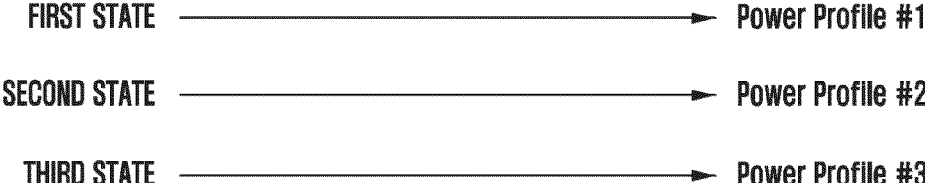
FIG. 7 is a diagram illustrating an association with the power profile based on the terminal state according to an embodiment of the disclosure.

FIG. 7 is a diagram illustrating an association with the power profile based on the terminal state according to an embodiment of the disclosure.

As described herein, in the disclosure, a case in which three terminal states are defined is described as an illustration, but embodiments of the disclosure are not limited thereto. That is, the number and details of terminal states can be changed according to user settings or terminal settings.

With reference to FIG. 7, the terminal may associate terminal states with power profile indexes. Therefore, when the terminal confirms a state change, it may transmit the associated power profile index to the base station, and the base station may reconfigure the power profile based on the received power profile index.

However, the base station may configure again the same power profile as the power profile index transmitted by the terminal, or may configure again a different power profile with reference to the power profile index. Details are the same as described above.

Additionally, in this drawing, a case in which the terminal state and the power profile index are associated one to one is described as an illustration, but embodiments of the disclosure are not limited thereto.

That is, a plurality of power profile indexes may be associated with one state, or a plurality of states may be associated with one power profile index. If a plurality of power profile indexes are associated with one state, the terminal may transmit all the power profile indexes or may select one of the power profile indexes and transmit it to the base station. For example, if it is required to transmit one index, the terminal may transmit the index of a power profile having low power consumption.

Next, a description is given of a power profile. The network may configure at least one power profile to the terminal.

Here, at least one power profile configuration may be included in one BWP configuration, at least one BWP configuration may be included in one power profile, or the BWP and the power profile may be configured separately.

Each power profile may be composed of a set of plural parameters. For example, a set of multiple parameters included in a power profile may include at least one of parameters related to PDCCH monitoring (PDCCH-Config, ControlResourceSet, SearchSpace, etc.), parameters related to PDSCH or PUSCH resource allocation (PDSCH-Config, PUSCH-Config, pdsch-TimeDomainAllocation, pusch-TimeDomainResourceAllocation, etc.), a parameter related to the time-axis distance between PDCCH and PDSCH (k0), a parameter related to the time-axis distance between PDCCH and PUSCH (k2), a parameter related to the time-axis distance between PDSCH and PUCCH (k1), or parameters related to DRX (DRX-Config, drx-onDurationTimer, drx-Inactivity Timer, drx-ShortCycle, drx-ShortCycleTimer, etc.), and the parameter values may be different for different power profiles.

When at least one power profile is included in the BWP configuration, each power profile may be configured within the range of the parameters of the associated BWP. For example, each power profile may be configured to support only a portion of full items within the range supported by the parameters configured in the associated BWP.

For example, PDCCH monitoring parameter values set in the associated BWP may be applied as they are in power profile 11 or 12, but power profile 13 may include settings such as turning off some of the PDCCH monitoring parameters configured in the BWP so as not to monitor some CORESETs, turning off some of them so as not to monitor some Searchspacesets, or reducing the upper limit of the number of blind decodings to a certain number or less.

Alternatively, for example, in power profile 11, the parameter values set in the BWP in relation to the PDSCH, PUSCH, and PUCCH resource allocation parameters are applied as they are, but power profile 12 and power profile 13 may be configured to have restrictions such as placing restrictions on the values of K0, K1, and K2 (e.g., remove some values (e.g. 0) from the values of K0, K1, and K2), or placing restrictions on the pdsch-TimeDomainAllocation and pusch-TimeDomainResourceAllocation entries (e.g. remove some entries (e.g., entries whose distance between PDCCH and PDSCH, or PDCCH and PUSCH is shorter than a specific threshold) from the list).

In addition, when at least one BWP configuration is included in one power profile, the set of multiple parameters included in the power profile may include at least one of, for example, number of DL carriers, number of UL carriers, number of antennas used, number of multi-input multi-output (MIMO) layers, diversity order, width of aggregated BW, number of activated mm Wave modules, or BWP index, and the parameter values may be different for different power profiles. For example, the larger the carrier number, the larger the number of antennas used, the higher the number of MIMO layers, the higher the diversity order, the wider the width of the aggregated BW, and the larger the number of activated mm Wave modules, the more power can be consumed.

Meanwhile, the above-described parameters are only examples of parameters constituting a power profile. In addition, the above parameters may be used as parameters constituting the power profile even when the power profile and the BWP are configured separately, and may be applied both when the power profile includes at least one BWP configuration and when the BWP configuration includes at least one power profile configuration.

The terminal may associate the terminal state with the power profile based on such characteristics of a power profile configuration, and specific details are the same as described above and thus will be omitted.

Figure 8:
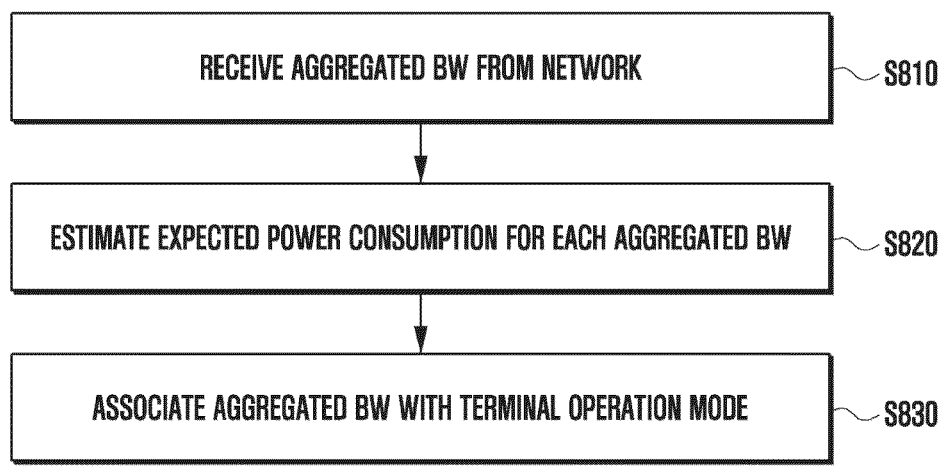
FIG. 8 is a diagram illustrating a method for associating aggregated bandwidths (aggregated BWs) based on terminal states according to an embodiment of the disclosure.

FIG. 8 is a diagram illustrating a method for associating aggregated bandwidths (aggregated BWs) based on terminal states according to an embodiment of the disclosure.

At step S810, the terminal may receive at least one aggregated BW configuration information from the network.

Thereafter, the terminal may estimate the expected power consumption for each aggregated BW. Here, the following methods may be used as a scheme for estimating the expected power consumption.

For example, the terminal may estimate the power consumption by using the power consumption expected when performing a unit operation for each parameter of the aggregated BW configuration. The terminal may store power consumption expected when performing a unit operation for estimating power consumption, and may calculate the power consumption based on this.

Alternatively, the network may indicate the estimated power consumption for each aggregated BW. The base station may indicate the estimated power consumption for each aggregated BW in an explicit or implicit manner. For example, the larger the value of the aggregated BW index, the more power consumption may be. Or, conversely, the larger the value of the aggregated BW index, the less power consumption may be. Or, information on the estimated power consumption may be included in the aggregated BW configuration.

Hence, at step S830, the terminal may associate the terminal state with the aggregated BW based on the estimated power consumption for each aggregated BW. Then, the terminal may store the association result, for example, in the form of a table. Thereafter, the network may reconfigure the aggregated BW configured in the terminal through an RRC message. The terminal may perform the operations as shown in FIG. 8 again by using the newly received aggregated BW configuration information, and the index of the aggregated BW associated with each terminal state may be changed accordingly.

Later, when the terminal state is changed, the terminal may operate according to FIG. 3. The user may change the state of the terminal through the touchscreen of the terminal or the like, and the terminal may receive or detect an input for a state change. Alternatively, the state of the terminal may be changed according to a predetermined condition. When the state of the terminal is changed, the terminal may determine the aggregated BW associated with the changed terminal state. Then, the terminal may transmit the associated aggregated BW to the network through a terminal message (e.g., UE assistance information). Accordingly, the network may receive the UE assistance information transmitted by the terminal, and use the corresponding information for aggregated BW reconfiguration. The base station may configure again the aggregated BW that is the same as the aggregated BW fed back by the terminal to the terminal, or may select an appropriate aggregated BW with reference to the aggregated BW fed back by the terminal and configure it again. For example, the terminal is changed to the third state (maximum power saving mode), and thus the terminal may transmit a terminal message with the FR2 BW of the aggregated BW set to 0.

Accordingly, when the network reconfigures the BW of the aggregated BW of the terminal to 0, the terminal may disconnect from the cell of the mm Wave band and power off all mm Wave modules. Alternatively, the base station may set the BW of the aggregated BW to the minimum size with reference to the BW included in the terminal message, and the terminal may operate correspondingly. Since specific details are the same as described above, they will be omitted below.

Figure 9:
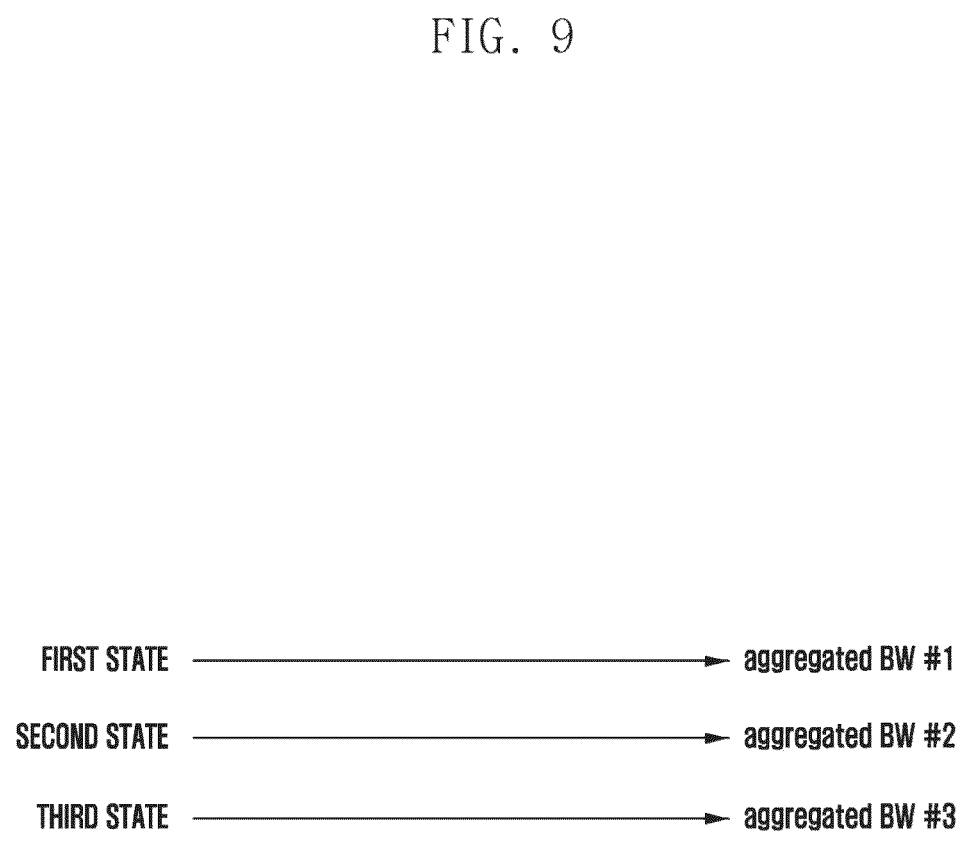

FIG. 9 is a diagram illustrating an association with the aggregated bandwidth (aggregated BW) based on the terminal state according to an embodiment of the disclosure.

With reference to FIG. 9, the terminal may associate the terminal state with the index of the aggregated BW, and may associate, for example, individual terminal states (e.g., normal (first) state/power saving (second) state/ultra power saving (third) state) with the aggregated BWs (e.g., BW_size1, BW_size2, BW_size3) for DL and UL.

For example, the aggregated BW size associated with the maximum power saving mode may be smaller than the aggregated BW size associated with the other modes (normal mode and medium power saving mode).

In addition, the terminal may designate one of the supported BW values as the aggregated BW value. The aggregated BW associated with the terminal state may have a value for each frequency range (FR, FR1:sub-6, FR2:above-6, mm Wave). For example, in the maximum power saving mode, the FR2 BW of the aggregated BW associated thereto may be set to 0.

Therefore, when the terminal confirms a state change, it may transmit the index of the associated aggregated BW to the base station, and the base station may reconfigure the aggregated BW based on the received aggregated BW index.

However, the base station may configure again the same aggregated BW as the aggregated BW index transmitted by the terminal, or may configure again a different aggregated BW with reference to the aggregated BW index. Details are the same as described above.

Additionally, in this drawing, a case in which the terminal state and the aggregated BW index are associated one to one is described as an illustration, but embodiments of the disclosure are not limited thereto.

That is, a plurality of aggregated BW indexes may be associated with one state, or a plurality of states may be associated with one aggregated BW index. If a plurality of aggregated BW indexes are associated with one state, the terminal may transmit all the aggregated BW indexes or may select one of the aggregated BW indexes and transmit it to the base station. For example, if it is required to transmit one index, the terminal may transmit the index of an aggregated BW having low power consumption.

Figure 10:
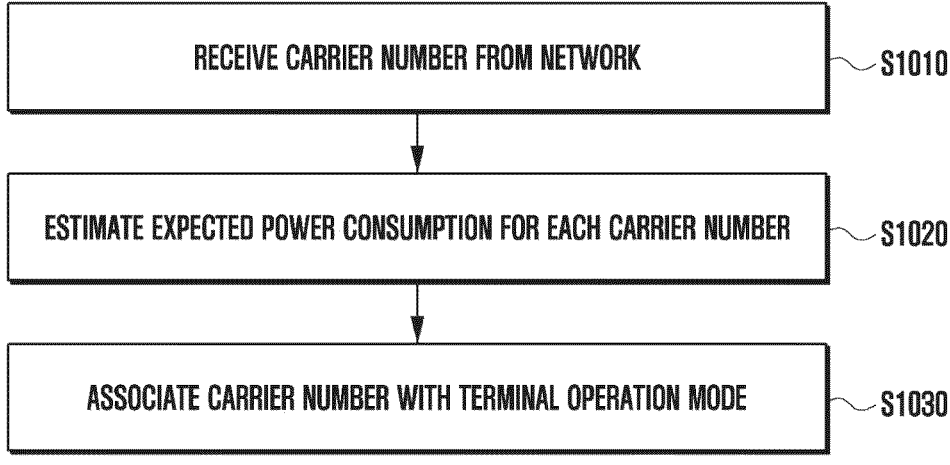
FIG. 10 is a diagram illustrating a method for associating the carrier numbers based on terminal states according to an embodiment of the disclosure.

FIG. 10 is a diagram illustrating a method for associating the carrier numbers based on terminal states according to an embodiment of the disclosure.

At step S1010, the terminal may receive configuration information about at least one carrier number from the network (for example, carrier numbers of 2, 3 and 4 may be configured as a power-related parameter). Alternatively, the terminal may receive information on the maximum number of configurable carriers (for example, the maximum number of carriers that can be configured by the terminal may be set to 4, in which case the maximum value is only an embodiment and can be changed).

Thereafter, the terminal may estimate the expected power consumption for each carrier number. The terminal may estimate the expected power consumption for each configurable carrier number within the maximum carrier number, or may estimate the expected power consumption for each configured carrier number. Here, the following methods may be used as a scheme for estimating the expected power consumption.

For example, the terminal may estimate the power consumption by using the power consumption expected when performing a unit operation for each carrier number. The terminal may store power consumption expected when performing a unit operation for estimating power consumption, and may calculate the power consumption based on this.

Alternatively, the network may indicate the estimated power consumption for each carrier number.

Hence, at step S1030, the terminal may associate the terminal state with the carrier number based on the estimated power consumption for each carrier number. Then, the terminal may store the association result, for example, in the form of a table.

However, when associating the state of the terminal with the carrier number, the process of estimating power consumption may be omitted. That is, since power consumption increases as the carrier number increases, the terminal may also associate the carrier number with the terminal state without a process of estimating power consumption.

Thereafter, the network may reconfigure the carrier number configured in the terminal through an RRC message. The terminal may perform the operations as shown in FIG. 10 again by using the newly received configuration information, and the index of the carrier number associated with each terminal state may be changed accordingly.

Later, when the terminal state is changed, the terminal may operate according to FIG. 3. The user may change the state of the terminal through the touchscreen of the terminal or the like, and the terminal may receive or detect an input for a state change. Alternatively, the state of the terminal may be changed according to a predetermined condition. When the state of the terminal is changed, the terminal may determine the carrier number associated with the changed terminal state. Then, the terminal may transmit the associated carrier number to the network through a terminal message (e.g., UE assistance information). Accordingly, the network may receive the UE assistance information transmitted by the terminal, and use the corresponding information for carrier number reconfiguration. Since specific details are the same as described above, they will be omitted below.

Figure 11:
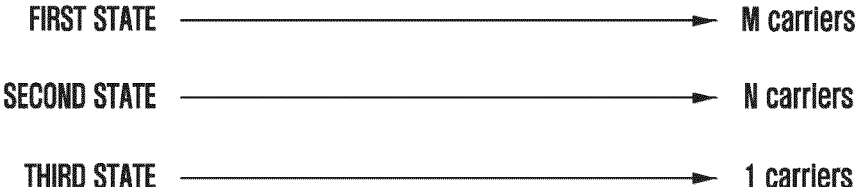
FIG. 11 is a diagram illustrating an association with the carrier number based on the terminal state according to an embodiment of the disclosure.

FIG. 11 is a diagram illustrating an association with the carrier number based on the terminal state according to an embodiment of the disclosure.

The network may configure a plurality of DL carriers or a plurality of UL carriers in the terminal. Thereby, the network may provide high throughput to the terminal, or it may implement network scheduling in a simpler way or implement functions such as offloading.

The terminal may associate the terminal state with the carrier number, and associate, for example, the carrier number (e.g., number of DL carriers, number of UL carriers, number of DL and UL carriers) with each terminal state (e.g., normal/power saving/ultra power saving). For example, the maximum power saving mode may be associated (or mapped) with one DL carrier and one UL carrier.

Therefore, when the terminal confirms a state change, it may transmit the associated carrier number index or the carrier number to the base station, and the base station may reconfigure the carrier number based on the received carrier number index or carrier number.

Additionally, in this drawing, a case in which the terminal state and the carrier number are associated one to one is described as an illustration, but embodiments of the disclosure are not limited thereto. The specific details are the same as described above.

Figure 12:
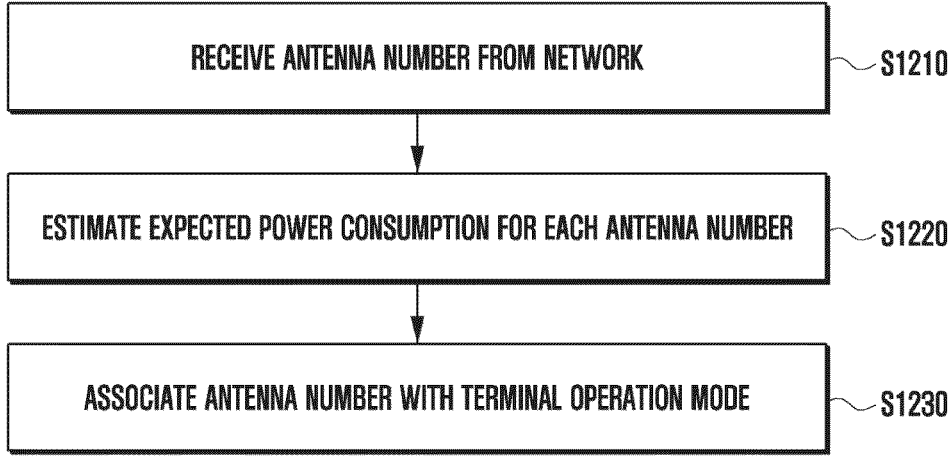
FIG. 12 is a diagram illustrating a method for associating the antenna numbers based on terminal states according to an embodiment of the disclosure.

FIG. 12 is a diagram illustrating a method for associating the antenna numbers based on terminal states according to an embodiment of the disclosure.

At step S1210, the terminal may receive configuration information about at least one antenna number from the network. Alternatively, the terminal may receive information on the maximum number of configurable antennas.

Thereafter, the terminal may estimate the expected power consumption for each antenna number. The terminal may estimate the expected power consumption for each configurable antenna number within the maximum antenna number, or may estimate the expected power consumption for each configured antenna number. Here, the following methods may be used as a scheme for estimating the expected power consumption.

For example, the terminal may estimate the power consumption by using the power consumption expected when performing a unit operation for the antenna number. The terminal may store power consumption expected when performing a unit operation for estimating power consumption, and may calculate the power consumption based on this.

Alternatively, the network may indicate the estimated power consumption for each antenna number.

Hence, at step S1230, the terminal may associate the terminal state with the carrier number based on the estimated power consumption for each antenna number. Then, the terminal may store the association result, for example, in the form of a table.

However, when associating the state of the terminal with the antenna number, the process of estimating power consumption may be omitted. That is, since power consumption increases as the antenna number increases, the terminal may also associate the antenna number with the terminal state without a process of estimating power consumption.

Thereafter, the network may reconfigure the antenna number configured in the terminal through an RRC message. The terminal may perform the operations as shown in FIG. 12 again by using the newly received configuration information, and the index of the antenna number associated with each terminal state may be changed accordingly.

Later, when the terminal state is changed, the terminal may operate according to FIG. 3. The user may change the state of the terminal through the touchscreen of the terminal or the like, and the terminal may receive or detect an input for a state change. Alternatively, the state of the terminal may be changed according to a predetermined condition. When the state of the terminal is changed, the terminal may determine the antenna number associated with the changed terminal state. Then, the terminal may transmit MIMO-LayersDL and MIMO-LayersUL obtained from the associated antenna number to the network through a terminal message (e.g., UE assistance information). Accordingly, the network may receive the UE assistance information transmitted by the terminal, and use the corresponding information for antenna number reconfiguration. Since specific details are the same as described above, they will be omitted below.

Figure 13:
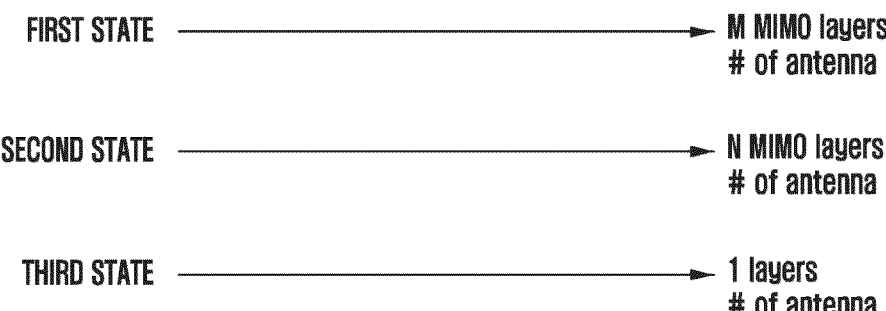
FIG. 13 is a diagram illustrating an association with the antenna number based on the terminal state according to an embodiment of the disclosure.

FIG. 13 is a diagram illustrating an association with the antenna number based on the terminal state according to an embodiment of the disclosure.

The terminal may provide a higher throughput to the user by obtaining a diversity gain or multiplexing gain through a plurality of antennas, which may lead to a result of enhancing the user experience, but the use of multiple antennas means that the terminal consumes more power. Hence, the maximum order of multiplexing achievable in the channel between the terminal and the base station may be limited by the number of antennas to be used by the terminal, and the diversity gain may also be limited by the number of antennas to be used by the terminal.

The terminal may associate the terminal state with the antenna number, and associate, for example, the numbers of antennas to be used for DL and UL with each terminal state (e.g., normal/power saving/ultra power saving). For example, the numbers of DL and UL antennas to be used by the terminal in association with the maximum power saving mode may be one. That is, in this case, the base station and the terminal operate in the SISO mode, and there is no RX/TX diversity gain of the terminal, but power consumption of the terminal due to antenna operation can be reduced as much as possible.

Therefore, when the terminal confirms a state change, it may transmit the associated antenna number index or the antenna number to the base station, and the base station may reconfigure the antenna number based on the received antenna number index or antenna number.

Additionally, in this drawing, a case in which the terminal state and the antenna number are associated one to one is described as an illustration, but embodiments of the disclosure are not limited thereto. The specific details are the same as described above.

In addition, the terminal may be equipped with at least one mm Wave module to support the mmWave band. The terminal may obtain beam diversity through plural mmWave modules, but this entails high power consumption of the terminal. Each terminal state (e.g., normal/power saving/ ultra power saving) may be associated with the number of mm Wave modules to be used. For example, the number of mmWave modules to be used by the terminal in association with the maximum power saving mode may be 0, the number of mm Wave modules to be used by the terminal in association with the medium power saving mode may be 1, and the number of mm Wave modules to be used by the terminal in association with the normal mode may be 1 or more (e.g., 1, 2, 3). The terminal may transmit information (numbers of beams that can be operated simultaneously for DL and UL, respectively) obtained from the number of mm Wave modules to be used in association to the network through UE assistance information. The network may receive the UE assistance information transmitted by the terminal and use the corresponding information for reconfiguration of the terminal. Specific details are the same as described above.

In addition, the terminal may associate each terminal state (e.g., normal/power saving/ultra power saving) with reduce-dUE-CategoryDL and reducedUE-CategoryUL. The UE-category associated with the power saving mode may have a lower value than that associated with the normal mode, and the UE-category associated with the ultra power saving mode may have a lower value than that associated with the power saving mode.

The user may change the state of the terminal through the touchscreen equipped in the terminal or the like, and the terminal may receive or detect an input for a state change. Alternatively, the state of the terminal may be changed according to a predetermined condition. When the state of the terminal is changed, the terminal may determine the UE-category associated with the changed terminal state. Then, the terminal may transmit the associated UE-category to the network through a terminal message (e.g., UE assistance information). The network may receive the UE assistance information transmitted by the terminal, and use the corresponding information for reconfiguration.

In addition, the terminal may associate each terminal state (e.g., normal/power saving/ultra power saving) with a radio access technology (RAT), and thus the RAT to be used may be determined according to the terminal state. For example, in a power-saving/ultra-power-saving situation, it is possible to turn off all of 5G and fall back to LTE, or turn off some of 5G.

Specifically, the terminal may receive at least one RAT configuration information from the network, and the terminal may estimate the expected power consumption for each RAT.

For example, the terminal may estimate the power consumption by using the power consumption expected when performing a unit operation for each parameter of the RAT configuration. The terminal may store power consumption expected when performing a unit operation for estimating power consumption, and may calculate the power consumption based on this.

Alternatively, the network may indicate the estimated power consumption for each RAT. The base station may indicate the estimated power consumption for each RAT in an explicit or implicit way.

In addition, the terminal may associate the terminal state with the RAT based on the estimated power consumption for each RAT, and may store this. Later, when the terminal state is changed, the terminal may operate according to FIG. 3.

The user may change the state of the terminal through the touchscreen of the terminal or the like, and the terminal may receive or detect an input for a state change. Alternatively, the state of the terminal may be changed according to a predetermined condition. When the state of the terminal is changed, the terminal may determine the RAT associated with the changed terminal state. Then, the terminal may operate by using the associated RAT.

For example, when a terminal operating in a 5G standalone network changes its state and enters the power saving/ ultra power saving mode, it may search for an available 4G network in the neighborhood, connect to a found 4G network, and continue its operation.

For example, when a terminal operating in an E-UTRA NR dual connectivity (EN-DC) network changes its state and enters the power saving/ultra power saving state, it may release the 5G (NR) side connection and turn off the related RF module and CP module of the terminal. For instance, when a terminal operating in an EN-DC network changes its state and enters the power saving/ultra power saving mode, it may release some or all of the 5G (NR) above-6 connection and turn off the related RF module, CP module, and beamforming module of the terminal. For instance, when a terminal operating in an EN-DC network changes its state and enters the power saving/ultra power saving state, it may release some or all of the 5G (NR) sub-6 connection and turn off the related RF module and CP module of the terminal.

For example, when a terminal operating in an NR-E-UTRA dual connectivity (NE-DC) network changes its state and enters the power saving/ultra power saving state, it may release the 4G (LTE) side connection and turn off the related RF module and CP module of the terminal. As another example, when a terminal operating in an NE-DC network changes its state and enters the power saving/ultra power saving state, it may change the master to 4G (LTE) and release the 5G (NR) connection.

In the above description, an association relationship between the terminal state (e.g., normal/power saving/ultra power saving) and multiple parameters has been described. The operation mode of the terminal and one parameter may be associated, the operation mode of the terminal and a plurality of parameters may be associated, and one or multiple associated parameters may be determined according to the operation mode of the terminal determined by a user input or the like.

In addition, UE assistance information has been described as an example of a terminal message transmitted from the terminal to the base station, but it is not limited thereto. For example, temporary capability signaling may be used, and MAC layer signaling may also be considered. For example, by adding a MAC CE, at least one of the above parameters may be delivered. Additionally, it may also be considered that the physical layer includes the above parameters in information that can be included in the UCI and transmits it through the PUCCH.

In addition, when the terminal is connected in the form of LTE and NR dual connectivity such as EN-DC or NE-DC, signaling may be performed to the PCG and be applied to each connection, or signaling including desired parameters may be performed to each of the PCG and the SCG.

Meanwhile, when the terminal transmits a power-related parameter based on the terminal state to the network, the base station may receive it and determine whether to apply it. Specific details about this are the same as described above.

In addition, the base station may transmit a response signaling for reconfiguring power-related parameters to the terminal, and, as an example of this, RRC signaling (e.g. RRC reconfiguration) is illustrated in FIG. 2, but it is not limited thereto. MAC layer signaling (e.g., MAC CE) and physical layer signaling (e.g., PDCCH) may also be considered.

Meanwhile, the terminal may transmit a power-related parameter based on the terminal state to the network, and the terminal may operate according to the parameter having been transmitted by it after a preset time elapses from transmission of the power-related parameter without a separate configuration of the base station.

For example, when the terminal have entered the maximum power saving mode and have signaled the base station by setting the carrier number to 1 for each of DL and UL as an associated parameter, after a certain period of time elapses, the terminal may operate only on the DL carrier and UL carrier of the primary cell and may release the DL carrier and UL carrier of the remaining secondary cell and power off the RF module of the terminal associated therewith.

Figure 14:
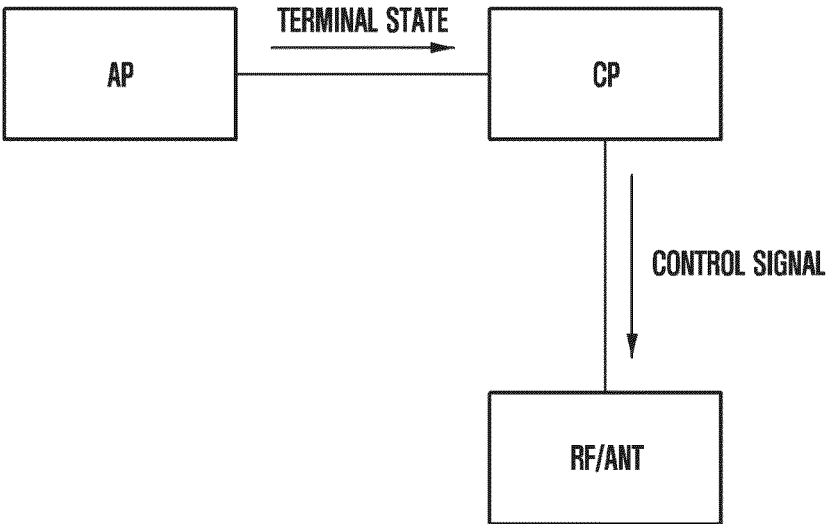
FIG. 14 illustrates the internal structure of a terminal according to an embodiment of the disclosure.

FIG. 14 illustrates the internal structure of a terminal according to an embodiment of the disclosure.

With reference to FIG. 14, the terminal may internally include an application processor (AP) 1410, a communication processor (CP) 1420, and an RF/ANT 1430. In addition, although not shown in the drawing, the terminal may further include a memory or the like.

The AP and the CP may be collectively referred to as a processor, a processing unit, or a controller, and the AP and the CP may be referred to as a first processor and a second processor, respectively.

The software running on the AP may receive a user input through a touchscreen display or the like connected to the AP.

For example, the user may select a desired terminal state (e.g., normal/power saving/ultra power saving) through "setting" application of the terminal, "widget" application of the terminal, or "quick" menu at the top/bottom of the terminal screen. Accordingly, the AP may detect (or obtain) an input for the terminal state and transmit it to the CP. Meanwhile, as described above, the state of the terminal may be changed according to a predetermined condition, and the AP may identify this and transmit it to the CP.

The CP may identify the power-related parameters (e.g., BWP, power profile, aggregated BW, carrier number, antenna operation, UE category, associated RAT) associated with the state of the terminal. This association information may be stored in, for example, the memory of the terminal. In addition, the CP may determine the control method (e.g., on/off, operation mode of the RF/antenna module) of the RF and antenna based on these associated parameters, transmit related control signals to the RF and antenna, and control the state of the CP itself (e.g., some modem on/off, clock adjustment).

Meanwhile, the AP may determine the parameter (e.g., BWP, power profile, aggregated BW, carrier number, antenna operation, UE category, associated RAT) associated with the identified terminal state based on the association information stored in the memory of the terminal. The AP may transmit the determined parameter to the CP, and, through this, the CP may transmit a control signal for controlling the RF and antenna to the RF and antenna and may control the operation mode of the CP itself.

In this way, power consumption of the terminal may be more efficiently managed by adjusting power-related parameters in the CP according to the state of the terminal detected by the AP.

Figure 15:
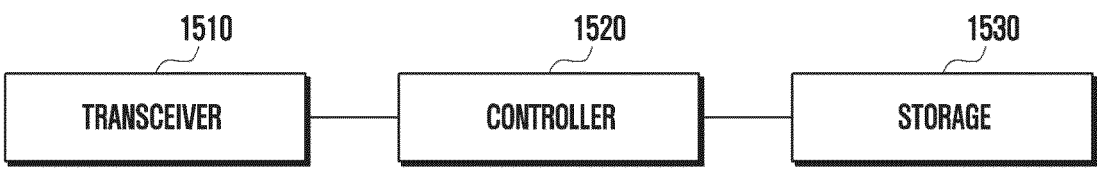
FIG. 15 is a diagram showing the configuration of a base station according to an embodiment of the disclosure.

FIG. 15 is a diagram showing the configuration of a base station according to an embodiment of the disclosure. With reference to FIG. 15, the base station may include a transceiver 1510, a controller 1520, and a storage 1530. In the disclosure, the controller may be defined as a circuit, an application-specific integrated circuit, or at least one processor.

The transceiver 1510 may transmit and receive signals to and from another network entity. For example, the transceiver 1510 may transmit information for configuring a power-related parameter to a terminal and may receive a terminal message from the terminal.

The controller 1520 may control the overall operation of the terminal according to embodiments proposed in the disclosure. For example, the controller 1520 may control signal flows between blocks to perform operations according to the above-described flowcharts. For example, the controller 1520 may identify a power-related parameter included in the terminal message and may reconfigure the power-related parameter to the terminal based on this. Specific details are the same as described above.

The storage 1530 may store at least one of information transmitted and received through the transceiver 1510 or information generated through the controller 1520.

Meanwhile, in the drawings for describing the method of the disclosure, the order of description does not necessarily correspond to the order of execution, and the order relationship may be changed or may be executed in parallel.

In addition, in the drawings for describing the method of the disclosure, some components may be omitted and only some components may be included within a range that does not impair the subject matter of the disclosure.

In addition, the method of the disclosure may be carried out by combining some or all of the contents included in individual embodiments within a range that does not impair the subject matter of the disclosure.

In addition, in the disclosure, the description of at least one of A, B, or C includes all of A, B, C, A&B, A&C, B&C, and A&B&C.

In addition, the embodiments disclosed in the specification and drawings are merely provided as specific examples for easy explanation and understanding of the disclosure, and are not intended to limit the scope of the disclosure. Therefore, as to the scope of the disclosure, it should be construed that not only the embodiments disclosed herein but also all the changed or modified forms derived based on the technical idea of the disclosure are included in the scope of the disclosure.

What is claimed is:
1. A terminal in a wireless communication system, comprising:
   a display;
   a communication circuit;
   a processor, comprising processing circuitry, operatively connected with the communication circuit; and
   memory storing instructions which, when executed by the processor, cause the terminal to:

receive, using the communication circuit, configuration information with respect to a 5G network communication from a base station;

operate, using the communication circuit, the terminal in a first communication state based at least in part on the configuration information received from the base station to establish a connection of the 5G network communication for the terminal; and based at least in part on a user input received via a mode setting menu displayed on the display while the terminal is operated in the first communication state to change a power state of the terminal, operate, using the communication circuit, the terminal in a second communication state, wherein the second communication state operates to release the connection of the 5G network communication for the terminal and maintain 4G network communication for the terminal based on the first communication state being a E-UTRA NR dual connectivity state, and wherein the second communication state operates to release the connection of the 5G network communication for the terminal and establish 4G network communication for the terminal based on the first communication state being a 5G stand-alone connectivity state.

2. The terminal of claim 1, wherein the processor includes an application processor and a communication processor, and wherein the memory stores instructions which, when executed by the application processor, cause the terminal to:

receive the user input to change the power state of the terminal.

3. The terminal of claim 2, wherein the memory stores instructions which, when executed by the application processor, cause the terminal to:

based at least in part on the receiving of the user input, provide the communication processor with a signal to release the connection of the 5G network communication for the terminal.

4. The terminal of claim 2, wherein the memory stores instructions which, when executed by the application processor, cause the terminal to:

identify, as at least part of the user input, a touch input received via the display.

5. The terminal of claim 1, wherein the memory stores instructions which, when executed by the processor, cause the terminal to:

transmit to the base station a message including information corresponding to a first power-related parameter associated with the power state of the terminal;

in response to the message, receive a second power-related parameter configured by the base station from the base station; and perform the operating of the terminal in the second communication state based on the second power-related parameter received from the base station.

6. The terminal of claim 5, wherein the memory stores instructions which, when executed by the processor, cause the terminal to:

identify, as at least part of the first power-related parameter, radio access technology (RAT) associated with the terminal with respect to the power state.

7. The terminal of claim 5, wherein the first power-related parameter includes at least one of a bandwidth part (BWP), a power profile, an aggregated bandwidth (BW), a number of one or more carriers, an antenna operation, or a user equipment (UE) category.

8. The terminal of claim 1, wherein the memory stores instructions which, when executed by the processor, cause the terminal to:

restrict a number of one or more carriers as at least part of the operating of the terminal in the second communication state.

9. The terminal of claim 1, wherein the communication circuit includes a radio frequency integrated circuit (RFIC).

10. A terminal in a wireless communication system, comprising:

a display;

a communication circuit;

a processor, comprising processing circuitry, operatively connected with the communication circuit; and memory storing instructions which, when executed by the processor, cause the terminal to:

operate, using the communication circuit, the terminal in a first communication state associated with a specified bandwidth part (BWP) corresponding to a 5G network communication based at least in part on configuration information received from a base station; and based at least in part on a user input received via a mode setting menu displayed on the display while the terminal is operated in the first communication state to change a power state of the terminal, operate, using the communication circuit, the terminal in a second communication state, wherein the second communication state operates to release connection of the 5G network communication for the terminal and maintain 4G network communication for the terminal based on the first communication state being a E-UTRA NR dual connectivity state, and wherein the second communication state operates to release the connection of the 5G network communication for the terminal and establish 4G network communication for the terminal based on the first communication state being a 5G stand-alone connectivity state.

11. The terminal of claim 10, wherein the memory stores instructions which, when executed by the processor, cause the terminal to:

as at least part of the operating of the terminal in the second communication state, operate the terminal using long term evolution (LTE).

12. The terminal of claim 10, wherein the memory stores instructions which, when executed by the processor, cause the terminal to:

as at least part of the operating of the terminal in the second communication state, operate the terminal using a BWP different from the specified BWP.

13. The terminal of claim 12, wherein the terminal in the second communication state operated using the different BWP consumes less power than the terminal in the second communication state using the specified BWP.

14. The terminal of claim 10, wherein the processor includes an application processor and a communication processor, and wherein the memory stores instructions which, when executed by the application processor, cause the terminal to:

receive the user input to change the power state of the terminal.

15. The terminal of claim 14, wherein the memory stores instructions which, when executed by the application processor, cause the terminal to:

based at least in part on the receiving of the user input, provide the communication processor with a signal to release the 5G network communication for the terminal.

16. The terminal of claim 14, wherein the memory stores instructions which, when executed by the application processor, cause the terminal to:

identify, as at least part of the user input, a touch input received via the display.

17. The terminal of claim 10, wherein the communication circuit includes a radio frequency integrated circuit (RFIC).

\* \* \* \* \*